US012623217B2

(12) United States Patent
Zhang et al.

(10) Patent No.: US 12,623,217 B2
(45) Date of Patent: May 12, 2026

(54) MICROFLUIDIC DEVICE AND APPLICATION METHOD THEREOF

(71) Applicant: Shanghai Tianma Micro-electronics Co., Ltd., Shanghai (CN)

(72) Inventors: Kaidi Zhang, Shanghai (CN); Baiquan Lin, Shanghai (CN); Yunfei Bai, Shanghai (CN); Wei Li, Shanghai (CN); Xiaojun Chen, Shanghai (CN); Qingsan Zhu, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 569 days.

(21) Appl. No.: 18/114,446

(22) Filed: Feb. 27, 2023

(65) Prior Publication Data

US 2024/0165608 A1 May 23, 2024

(30) Foreign Application Priority Data

Nov. 22, 2022 (CN) ......................... 202211466447.9

(51) Int. Cl.
*B01L 3/00* (2006.01)

(52) U.S. Cl.
CPC ..... *B01L 3/502707* (2013.01); *B01L 2200/12* (2013.01); *B01L 2300/0645* (2013.01); *B01L 2300/12* (2013.01)

(58) Field of Classification Search
CPC ........... B01L 3/502707; B01L 2200/12; B01L 2300/0645; B01L 2300/12; B01L 3/502715
See application file for complete search history.

(56) References Cited

U.S. PATENT DOCUMENTS 11,498,068 B2 * 11/2022 Yao .................. G01N 33/54326
2018/0326417 A1 * 11/2018 Wikswo ................. C12M 23/34
2022/0314217 A1 * 10/2022 Gu .................... B01L 3/502715

FOREIGN PATENT DOCUMENTS

CN 108956467 B 12/2018
CN 111584448 A 8/2020

* cited by examiner

*Primary Examiner* — Brian J. Sines
(74) *Attorney, Agent, or Firm* — Anova Law Group, PLLC

(57) ABSTRACT

Microfluidic device and application method thereof are provided. The microfluidic device includes a first substrate and a second substrate that are oppositely arranged along a first direction; and a first storage box and a second storage box that are oppositely arranged along the first direction. The first direction is a thickness direction of the microfluidic device. The first storage box includes a first storage cavity and a first opening communicating with the first storage cavity, and the first substrate is fixed in the first storage cavity. The second storage box includes a second storage cavity and a second opening communicating with the second storage cavity, and the second substrate is fixed in the second storage cavity. Along the first direction, the first opening is arranged opposite to the second opening and the first storage box is nested with the second storage box.

18 Claims, 16 Drawing Sheets

MICROFLUIDIC DEVICE AND APPLICATION METHOD THEREOF

CROSS-REFERENCE TO RELATED APPLICATION

This application claims priority of Chinese Patent Application No. 202211466447.9, filed on Nov. 22, 2022, the entire contents of which are hereby incorporated by reference.

FIELD OF THE DISCLOSURE

The present disclosure generally relates to the field of microfluidic technology and, more particularly, relates to a microfluidic device, and an application method thereof.

BACKGROUND

Microfluidic technology is an emerging interdisciplinary technology involving chemistry, fluid physics, microelectronics, new material, biology, and biomedical engineering, which can precisely control a movement of a droplet, realize a fusion and separation of droplets, and complete various biochemical reactions. Microfluidic technology is a technology mainly characterized by a manipulation of fluids in a micron-scale space. In recent years, microfluidic chips have advantages of small size, low power consumption, low cost, and small amount of samples and reagents required, which can achieve individual and precise control of droplets, short detection time, high sensitivity, and easy integration with other devices, and are widely applied in biology, chemistry, medicine, and other fields.

In a related art, microfluidic device includes a first substrate and a second substrate that are oppositely arranged and a channel between the first substrate and the second substrate. Usually, the first substrate and the second substrate are boxed with double-sided tape or gasket and glue by hand, which is cumbersome in forming process and poor in alignment accuracy.

BRIEF SUMMARY OF THE DISCLOSURE

One aspect of the present disclosure provides a microfluidic device. The microfluidic device includes a first substrate and a second substrate that are oppositely arranged along a first direction; and a first storage box and a second storage box that are oppositely arranged along the first direction. The first direction is a thickness direction of the microfluidic device. The first storage box includes a first storage cavity and a first opening communicating with the first storage cavity, and the first substrate is fixed in the first storage cavity. The second storage box includes a second storage cavity and a second opening communicating with the second storage cavity, and the second substrate is fixed in the second storage cavity. Along the first direction, the first opening is arranged opposite to the second opening, the first storage box is nested with the second storage box, and a first channel is formed between the first substrate and the second substrate. The microfluidic device also includes a liquid guide hole passing through the second substrate and the second storage box along the first direction and communicating with the first channel.

Another aspect of the present disclosure provides an application method of the microfluidic device. The application method includes: respectively forming a first storage box, a second storage box, a first substrate and a second substrate; nesting the first substrate into a first storage cavity of the first storage box through a first opening of the first storage box, and nesting the second substrate into a second storage cavity of the second storage box through a second opening of the second storage box; oppositely arranging the first opening and the second opening, nesting the first storage box and the second storage box to form a first channel between the first substrate and the second substrate; injecting silicone oil into the first channel through liquid guide holes, and injecting a detection liquid into the first channel through the liquid guide holes; and providing electrical signals to the first substrate and the second substrate to detect a detection liquid.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated in and constitute part of the present specification, illustrate embodiments of the present disclosure and together with a description, serve to explain principles of the present disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the present disclosure and specification or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and is not used as a limitation. Accordingly, other examples of exemplary embodiments may have different values.

It is apparent to a person skilled in the art that various modifications and variations can be made in the present disclosure without departing from the spirit or scope of the disclosures. Accordingly, the present disclosure is intended to cover modifications and variations of the present disclosure that fall within the scope of corresponding claims (claimed technical solutions) and equivalents thereof. It should be noted that, implementations provided in the embodiments of the present disclosure may be combined with each other without conflict.

It should be noted that similar numerals and letters refer to similar items in the accompanying drawing described below. Therefore, once an item is defined in one accompanying drawing, further discussion of the item in subsequent accompanying drawings may not be required.

Figure 1:
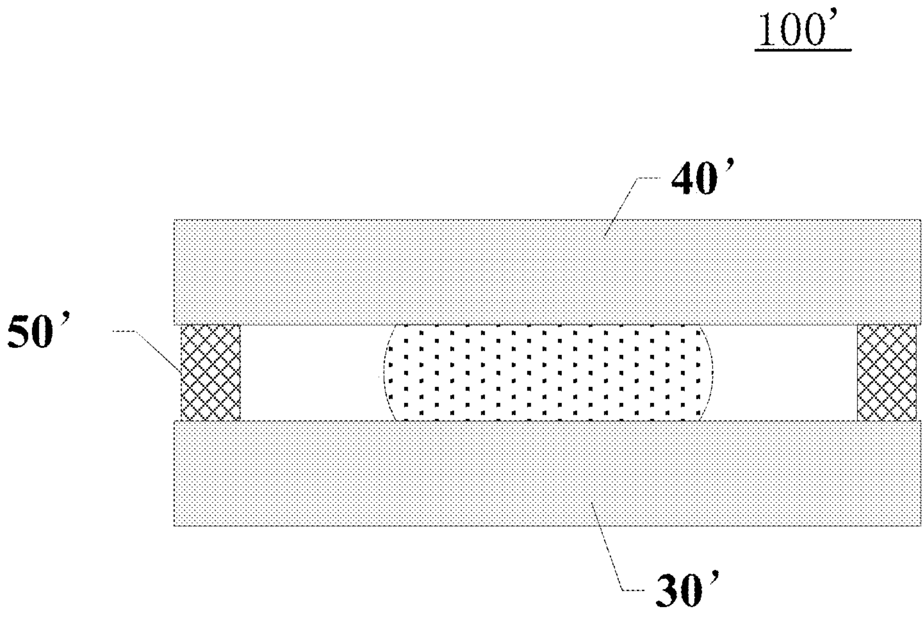
FIG. 1 illustrates a schematic diagram of a microfluidic device.

FIG. 1 illustrates a schematic diagram of a microfluidic device. A microfluidic device 100' includes a first substrate 30' and a second substrate 40' that are oppositely arranged. The first substrate 30' and the second substrate 40' are sealed by a colloid 50', so that a channel for containing silicone oil and a detection liquid is formed between the first substrate 30' and the second substrate 40'. A process of sealing the first substrate 30' and the second substrate 40' is a manual operation, which is cumbersome and inefficient, and the manual operation also makes it difficult to effectively control an alignment accuracy of the first substrate 30' and the second substrate 40'.

In view of the above, the present disclosure provides a microfluidic device, including: a first substrate and a second substrate that are oppositely arranged along a first direction, and a first storage box and a second storage box that are oppositely arranged along the first direction. The first direction is a thickness direction of the microfluidic device. The first storage box includes a first storage cavity and a first opening communicating with the first storage cavity, and the first substrate is fixed in the first storage cavity. The second storage box includes a second storage cavity and a second opening communicating with the second storage cavity, and the second substrate is fixed in the second storage cavity. Along the first direction, the first opening is opposite to the second opening, the first storage box is nested with the second storage box, and a first channel is formed between the first substrate and the second substrate. The microfluidic device also includes a liquid guide hole penetrating the second substrate and the second storage box along the first direction and communicates with the first channel. A nesting of the first storage box and the second storage box is conductive to simplifying a production process of the microfluidic device, improving a production efficiency without manual adjustment, and improving an alignment accuracy between the first substrate and the second substrate.

The above is a core idea of the present disclosure, and technical solutions in the embodiments of the present disclosure will be clearly and completely described below in conjunction with the accompanying drawings in the embodiments of the present disclosure. Based on the embodiments of the present disclosure, all other embodiments obtained by a person skilled in the art without making creative efforts belong to the protection scope of the embodiments of the present disclosure.

Figure 2:
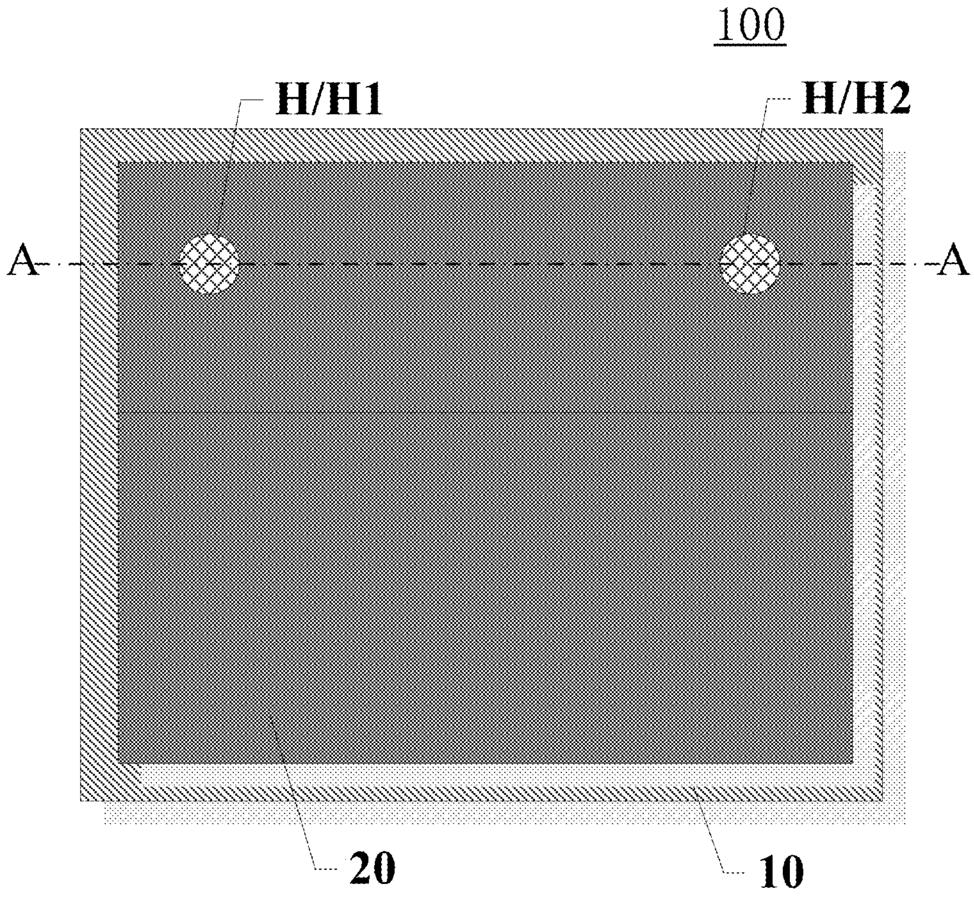
FIG. 2 illustrates a planar view of a microfluidic device provided by an embodiment of the present disclosure.
Figure 3:
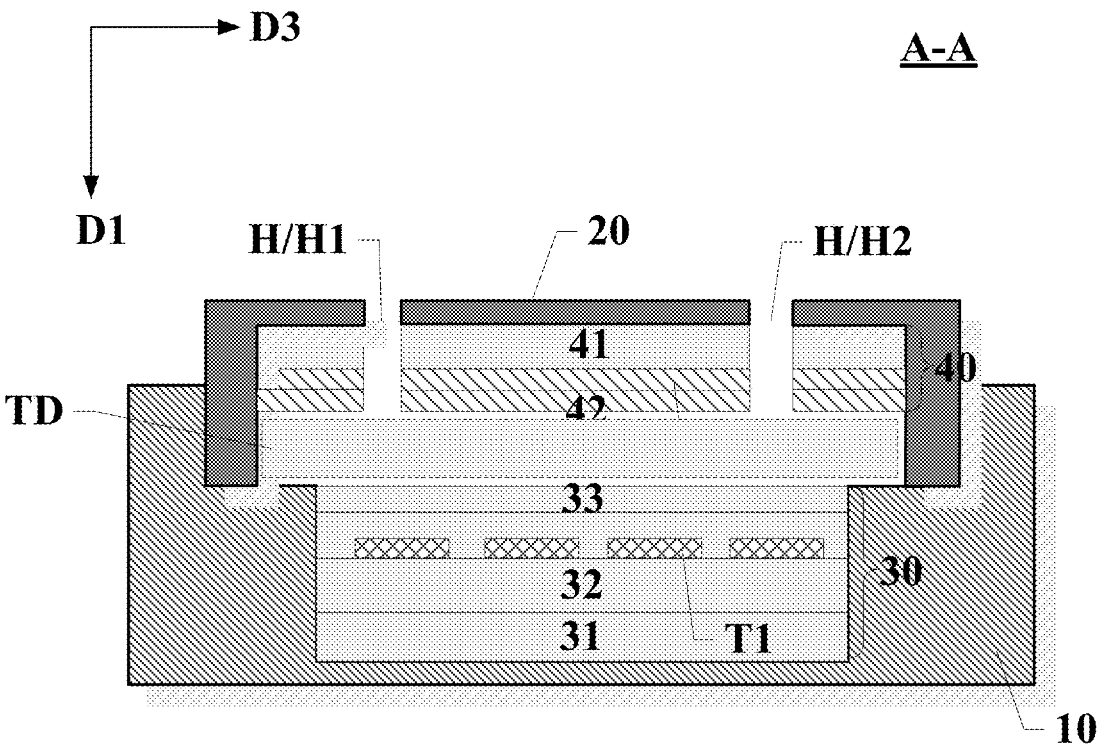
FIG. 3 illustrates an A-A cross-sectional view of the microfluidic device in FIG. 2.
Figure 4:
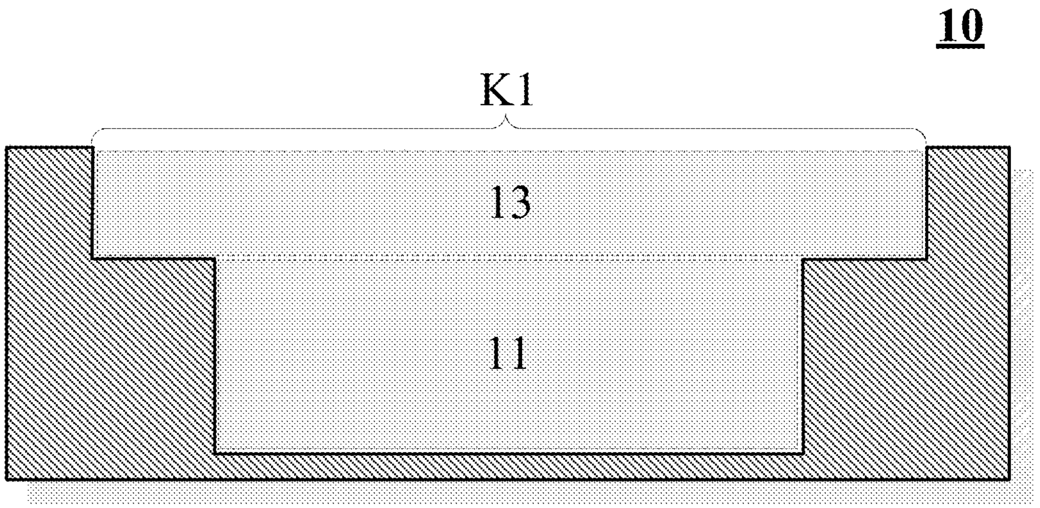
FIG. 4 illustrates a schematic diagram of a first storage box in a microfluidic device provided by an embodiment of the present disclosure.
Figure 5:
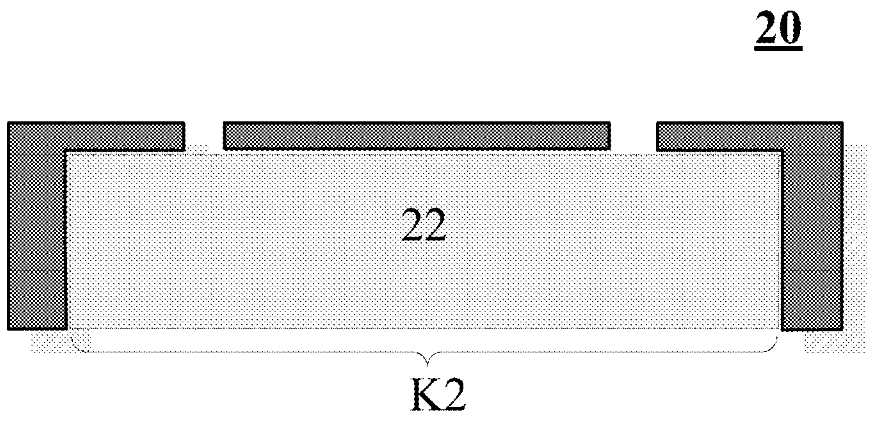
FIG. 5 illustrates a schematic diagram of a second storage box in a microfluidic device provided by an embodiment of the present disclosure.

FIG. 2 illustrates a planar view of a microfluidic device provided by an embodiment of the present disclosure. FIG. 3 illustrates an A-A cross-sectional view of the microfluidic device in FIG. 2. FIG. 4 illustrates a schematic diagram of a first storage box in a microfluidic device provided by an embodiment of the present disclosure. FIG. 5 illustrates a schematic diagram of a second storage box in a microfluidic device provided by an embodiment of the present disclosure. Referring to FIGS. 2-5, one embodiment of the present disclosure provides a microfluidic device 100, including: a first substrate 30 and a second substrate 40 oppositely arranged along a first direction D1, and a first storage box 10 and a second storage box 20 oppositely arranged along the first direction D1. The first direction D1 is a thickness direction of the microfluidic device 100.

The first storage box 10 includes a first storage cavity 11 and a first opening K1 communicating with the first storage cavity 11, and the first substrate 30 is fixed in the first storage cavity 11. The second storage box 20 includes a second storage cavity 22 and a second opening K2 communicating with the second storage cavity 22, and the second substrate 40 is fixed in the second storage cavity 22. Along the first direction D1, the first opening K1 and the second opening K2 are oppositely arranged, the first storage box 10 and the second storage box 20 are nested, and a first channel TD is formed between the first substrate 30 and the second substrate 40.

The microfluidic device 100 further includes liquid guide holes H, which penetrates the second substrate 40 and the second storage box 20 along the first direction D1 and communicates with the first channel TD.

It should be noted that FIG. 2 only schematically illustrates a planar structure of the microfluidic device and does not limit an actual shape of the microfluidic device. In addition to the rectangle shown in FIG. 2, the microfluidic device can also be in another possible shape such as a circle, a rectangle with rounded corners, or the like. A film layer structure in FIG. 3 only illustrates a relative positional relationship of the first storage box 10, the second storage box 20, the first substrate 30, and the second substrate 40, and does not provide any information on actual shapes and specific film layers of the above structures.

Referring to FIGS. 2-5, a first storage box 10 and a second storage box 20 are introduced in the microfluidic device 100. The first substrate 30 is fixed in the first storage cavity 11 of the first storage box 10, and the second substrate 40 is fixed in the second storage cavity 22 of the second storage box 20. The first storage box 10 and the second storage box 20 are oppositely arranged along the first direction D1 and assembled in a nested manner, so that the first substrate 30 and the second substrate 40 are oppositely arranged and the first channel TD is formed between the first substrate 30 and the second substrate 40. Therefore, the first channel TD can be formed without introducing structures such as double-sided tape or gasket between the first substrate 30 and the second substrate 40, and only the first storage box 10 and the second storage box 20 need to be nested, which is conducive to simplifying a production process of the microfluidic device and improving a production efficiency. By nesting the first storage box 10 and the second storage box 20, no manual adjustment is required, which is conducive to improving an alignment accuracy of the first substrate 30 and the second substrate 40.

Optionally, the first storage box 10 and the second storage box 20 can be made of a material with a certain elasticity. Optionally, when the first substrate 30 is arranged in the first storage box 10, the first substrate 30 is fixed in the first storage box 10 by nesting. For example, in one embodiment shown in FIG. 3, due to the certain elasticity of the first storage box 10, a width S1 of the first substrate 30 along a third direction D3 can be set to be equal to or slightly larger than a width S2 of the first storage cavity 11 of the first storage box 10 along the third direction D3, so that the first substrate 30 is fixed by a side wall of the first storage cavity 11 to prevent the first substrate 30 from falling off from the first storage cavity 11. The third direction D3 can be regarded as an arrangement direction of two opposite side walls of the first storage cavity 11. When the second substrate 40 is arranged in the second storage box 20, the second substrate 40 is fixed in the second storage box 20 by nesting. For example, in the embodiment shown in FIG. 3, since the second storage box 20 possesses a certain degree of elasticity, a lateral width of the second substrate 40 can be set to be equal to or slightly larger than a width of the second storage cavity 22 of the second storage box 20, so that the second substrate 40 can be fixed by a side wall of the second storage cavity 22, thereby preventing the second substrate 40 from falling out of the second storage cavity 22.

Optionally, referring to FIG. 3, in one embodiment, the first substrate 30 includes a first base 31, an array layer 32 arranged on a side of the first base 31, first electrodes T1 arranged on a side of the array layer 32 away from the first base 31, and a first hydrophobic layer 33 arranged on a side of the first electrodes T1 away from the first base 31. When the first substrate 30 is arranged in the first storage box 10, the first hydrophobic layer 33 is on a side of the first base 31 facing the first channel TD.

Optionally, in one embodiment, the second substrate 40 includes a second base 41, a second electrode T2 arranged on a side of the second base 41, and a second hydrophobic layer 42 arranged on a side of the second electrode T2 away from the second base 41. When the second substrate 40 is arranged in the second storage box 20, the second hydrophobic layer 42 is on a side of the second base 41 facing the first channel TD.

After the first storage box 10 and the second storage box 20 are nested, silicone oil injected into the first channel TD is in a space between the first hydrophobic layer 33 and the second hydrophobic layer 42.

In a related art, when the first substrate 30' and the second substrate 40' are sealed with the colloid 50', a manual operation is usually used, and misalignment may occur between electrodes on the first substrate 30' and electrodes on the second substrate 40', thereby resulting in a change in an overlapping area between the two parts of the electrodes, affecting an electric field between the two parts of the electrodes, and affecting a driving force of a droplet.

In one embodiment, an alignment method of the first substrate 30 and the second substrate 40 is changed, the first substrate 30 is fixed in the first storage box 10, and the second substrate 40 is fixed in the second storage box 20. A position of the first substrate 30 relative to the first storage box 10 is fixed, and a position of the second substrate 40 relative to the second storage box 20 is also fixed. When the first storage box 10 and the second storage box 20 are fixed by nesting, relative positions of the first storage box 10 and the second storage box 20 are fixed, so that relative positions of the first substrate 30 and the second substrate 40 are also fixed. Relative positions of the first electrodes T1 on the first substrate 30 and the second electrode T2 on the second substrate 40 are also fixed, which effectively avoids an alignment deviation between the first electrodes T1 and the second electrode T2, thereby effectively improving an alignment accuracy.

Referring to FIG. 4 and FIG. 5, combined with FIG. 3, in one optional embodiment, the first storage box 10 is integrally formed by injection molding, and the second storage box 20 is integrally formed by injection molding.

Optionally, the first storage box 10 and the second storage box 20 can be made of a transparent injection molding material such as PC (Polycarbonate, polycarbonate), polypropylene, or the like, and are injection molded in an integrated manner, which is conductive to simplifying a forming difficulty of the first storage box 10 and the second storage box 20, improving a production efficiency, and also improving a dimensional accuracy of the first storage box 10 and the second storage box 20.

In addition, the first storage box 10 and the second storage box 20 formed by integral molding of an injection molding material have a certain degree of elasticity. When the first substrate 30 is assembled with the first storage box 10, the first opening K1 and the first storage cavity 11 of the first storage box 10 can be slightly expanded by an external force. The first substrate 30 is arranged into the first storage cavity 11 through the first opening K1, the external force applied to the first opening K1 and the first storage cavity 11 is released. An inner wall of the second storage cavity 22 fits with the first substrate 30 to fix the first substrate 30 in the first storage cavity 11. Similarly, when the second substrate 40 is assembled with the second storage box 20, the second opening K2 and the second storage cavity 22 of the second storage box 20 can be slightly expanded by an external force. The second substrate 40 is arranged into the second storage cavity 22 through the second opening K2, the external force applied to the second opening K2 and the first storage cavity 22 is released. An inner wall of the second storage cavity 22 fits with the second substrate 40 to fix the second substrate 40 in the second storage cavity 22. Therefore, when the first substrate 30 is fixed to the first storage box 10 or the second substrate 40 is fixed to the second storage box 20, there is no need to introduce an additional material such as glue, which is conductive to simplifying an assembly process and saving a cost.

Referring to FIGS. 3-5, in one optional embodiment, the first storage box 10 includes a third storage cavity 13. Along the first direction D1, the third storage cavity 13 is between the first opening K1 and the first storage cavity 11, and the third storage cavity 13 communicates with the first opening K1 and the first storage cavity 11 respectively. An orthographic projection of a bottom of the third storage cavity 13 to a plane where the first substrate 30 is located surrounds an orthographic projection of the first storage cavity 11 to the plane where the first substrate 30 is located. At least part of the second storage box 20 is in the third storage cavity 13 and nested with an inner side wall of the third storage cavity 13.

Specifically, in one embodiment, a structure of the first storage box 10 is further refined, and the first storage box 10 includes two storage cavities. A storage cavity adjacent to a box bottom of the first storage box 10 is the first storage cavity 11 for accommodating the first substrate 30. Optionally, a shape of an orthographic projection of the first storage cavity 11 to the first storage box 10 is same as a shape of an outer contour of the first substrate 30. When the first substrate 30 is arranged in the first storage cavity 11, at least two opposite side walls of the first substrate 30 is in contact with an inner wall of the first storage cavity 11, thereby fixing the first substrate 30 by the inner wall of the first storage cavity 11.

The storage cavity adjacent to the first opening K1 in the first storage box 10 is the third storage cavity 13. When the first storage box 10 and the second storage box 20 arranged with the first substrate 30 and the second substrate 40 are nested, at least part of the second storage box 20 is in the third storage cavity 13. An outer wall of the second storage box 20 located in the third storage cavity 13 is nested with an inner wall of the third storage cavity 13.

Optionally, a width of an outer wall of the second storage box 20 is equal to or slightly larger than a width of an inner wall of the third storage cavity 13. When the second storage box 20 and the third storage cavity 13 are nested, a size of the first opening K1 of the first storage box 10 and a size of the third storage cavity 13 can be slightly enlarged by an external force. After the second storage box 20 is arranged in the third storage cavity 13, the external force applied to the first storage box 10 is released, so that an inner wall of the third storage cavity 13 can fix the second storage box 20. After the second storage box 20 is fixed, a volume of the first channel TD formed between the first substrate 30 and the second substrate 40 is also fixed, i.e., an amount of silicone oil that can be accommodated in the first channel TD is also fixed. Compared with a method of forming boxes using a double-sided adhesive tape or gasket by hand in a related art, a box thickness of the microfluidic device formed by nesting the first storage box 10 and the second storage box 20 in the present specification is more accurate.

Figure 6:
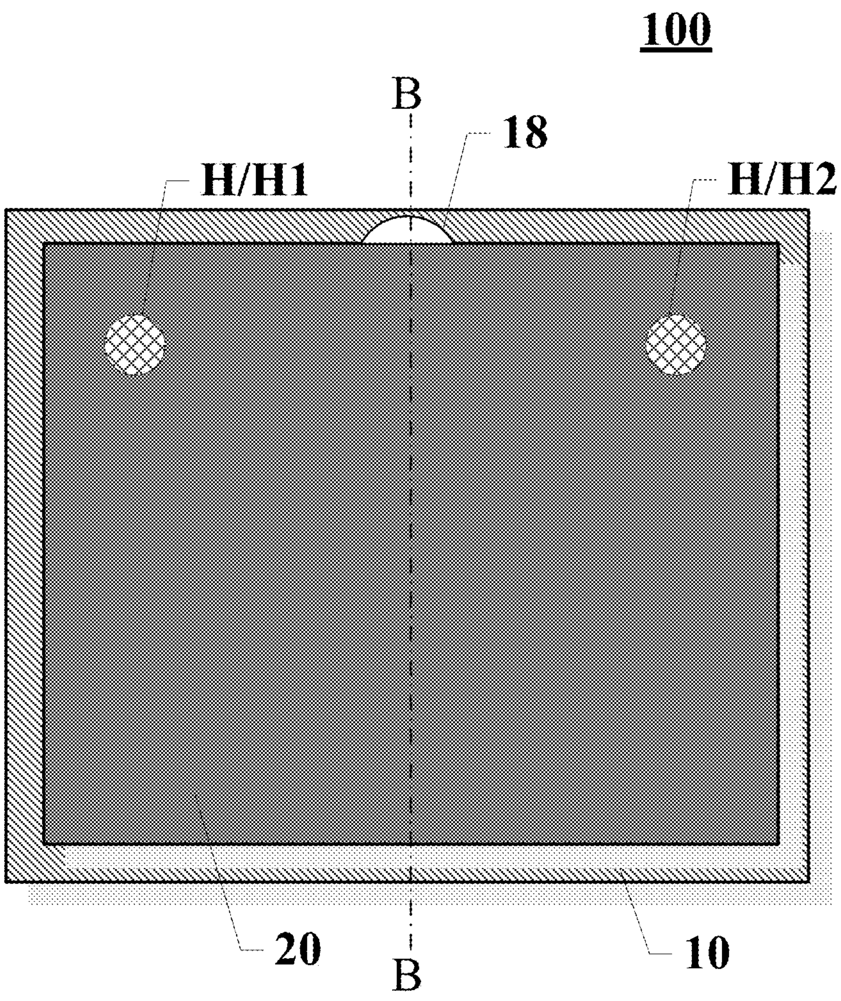
FIG. 6 illustrates another planar view of a microfluidic device provided by an embodiment of the present disclosure.
Figure 7:
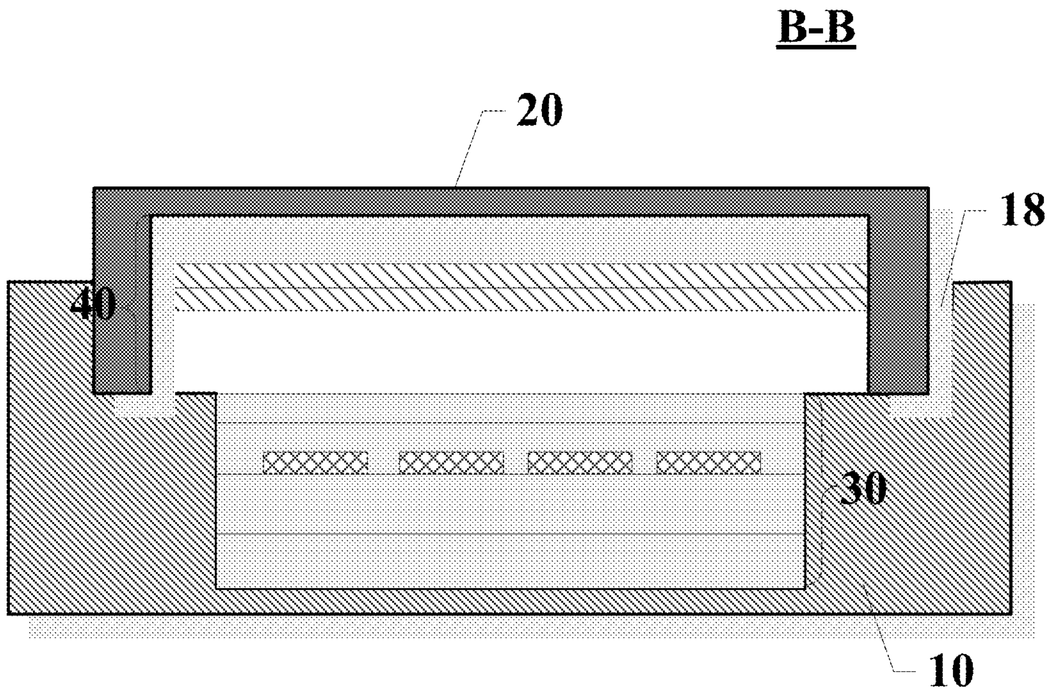
FIG. 7 illustrates a B-B cross-sectional view of the microfluidic device in FIG. 6.

FIG. 6 illustrates another planar view of a microfluidic device provided by an embodiment of the present disclosure. FIG. 7 illustrates a B-B cross-sectional view of the microfluidic device in FIG. 7. Referring to FIG. 6 and FIG. 7, in one optional embodiment, the third storage cavity 13 is arranged around the second storage box 20, an inner sidewall of the third storage cavity 13 includes at least one recessed part 18, and an empty groove is formed between an outer sidewall of the second storage box 20 and the recessed part 18.

Specifically, referring to FIG. 4 and FIG. 7, When the second storage box 20 is nested with the third storage cavity 13 in the first storage box 10, the third storage cavity 13 is wrapped around side walls of the second storage box 20, which is conductive to improving an overall sealing performance of the microfluidic device. In addition, in one embodiment, the at least one recessed part 18 is arranged on an inner wall of the third storage cavity 13, so that an empty groove is formed between an outer wall of the second storage box 20 and the recessed part 18. The empty groove can be configured as a gripping part to facilitate, during a process of assembling the first storage box 10 and the second storage box 20, an accurate arrangement of the second storage box 20 into the third storage cavity 13 of the first storage box 10, and to facilitate taking out the second storage box 20 from the first storage box 10 and separating the first storage box 10 from the second storage box 20.

It should be noted that FIG. 6 only illustrates a solution of providing the recessed part 18 on a side of an inner wall of the third storage cavity 13. In another embodiment, the recessed part 18 can also be arranged on an inner walls of opposite sides of the third storage cavity 13 to form two empty grooves as handles, to facilitate a grasping of the second storage box 20 and an insertion and removal of the second storage box 20.

Figure 8:
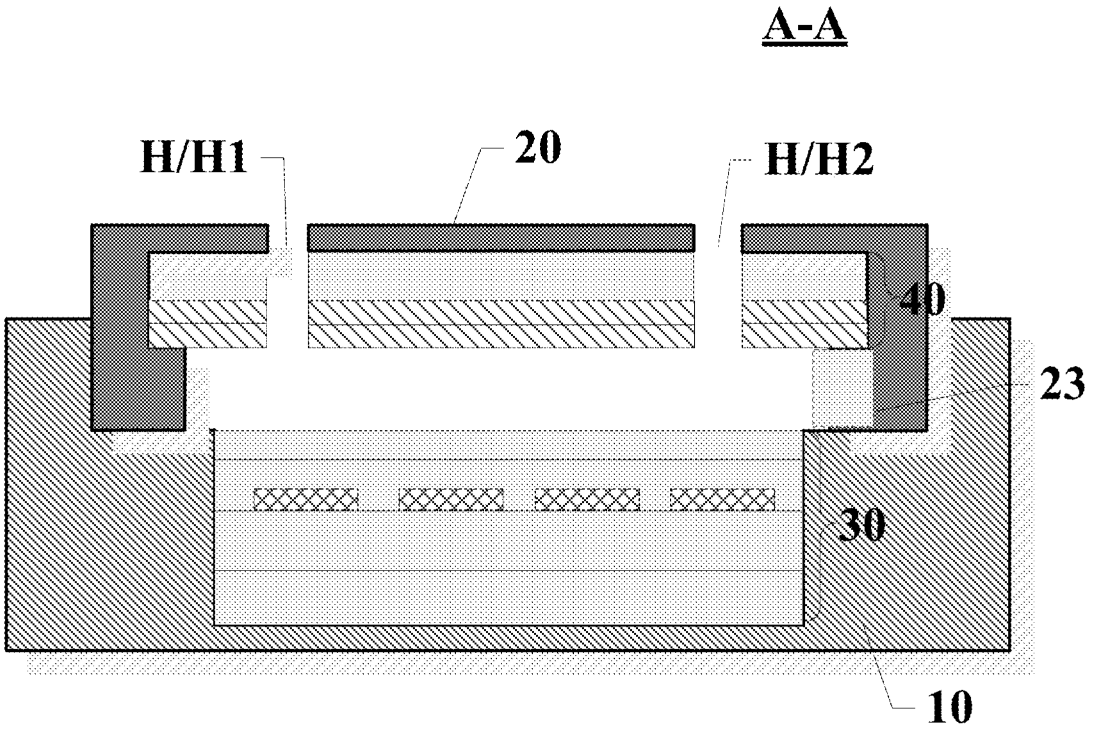
FIG. 8 illustrates another A-A cross-sectional view of the microfluidic device in FIG. 2.
Figure 9:
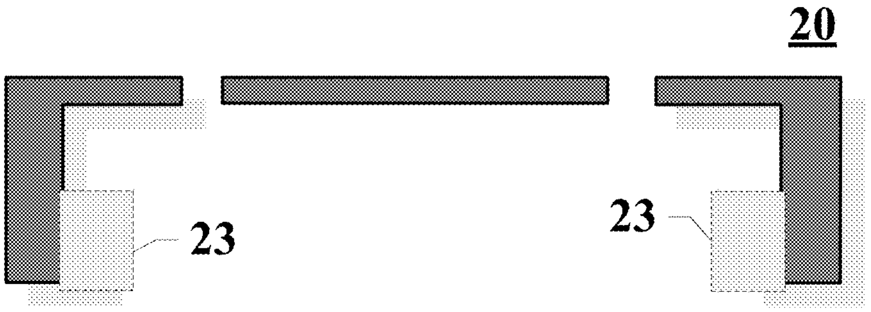
FIG. 9 illustrates a schematic diagram of a second storage box in the microfluidic device in FIG. 8.

FIG. 8 illustrates another A-A cross-sectional view of the microfluidic device in FIG. 2. FIG. 9 illustrates a schematic diagram of a second storage box in the microfluidic device in FIG. 8. Compared with the embodiments shown in FIG. 3 and FIG. 4, one embodiment shows another structure of the second storage box 20. Referring to FIG. 4, FIG. 5, FIG. 8, and FIG. 9, in one optional embodiment, the second storage box 20 includes a boss 23 connected to the side wall of the second storage cavity 22. The boss 23 surrounds the second opening K2, and an orthographic projection of the boss 23 to a plane where the second substrate 40 is located at least partially overlaps an orthographic projection of the second storage cavity 22 to the plane where the second substrate 40 is located. The second substrate 40 is fixed between the boss 23 and a bottom of the second storage cavity 22.

One embodiment shows another structure of the second storage box 20. Specifically, the boss 23 is introduced on a side wall of the second storage cavity 22 of the second storage box 20. The boss 23 surrounds the second opening K2 of the second storage box 20 and is opposite to the bottom of the second storage cavity 22. When the second substrate 40 is arranged in the second storage cavity 22, the second substrate 40 is in a space formed by a cavity bottom and the side wall of the second storage cavity 22 and the boss 23. The boss 23 can limit a position of the second substrate 40 to avoid a displacement of the second substrate 40 in the second storage cavity 22. After the first storage box 10 and the second storage box 20 are nested, a space surrounded by the first substrate 30, the second substrate 40 and the boss 23 is a space where the first channel TD of the microfluidic device is located. Therefore, a height of the boss 23 directly determines a depth of the first channel TD, thereby directly determining a box thickness of the microfluidic device. Since the height of the boss 23 is fixed, the box thickness of the microfluidic device is fixed and accurate, so the introduction of the boss 23 is more conducive to improving a control accuracy of the box thickness of the microfluidic device.

It should be noted that, referring to FIG. 4, FIG. 5, and FIG. 8, before the second substrate 40 needs to be arranged in the second storage cavity 22, an external force can be applied to the boss 23 to increase a size of the second opening K2. The second substrate 40 is arranged in a space formed by a cavity bottom and the side wall of the second storage cavity 22 and the boss 23. After the external force applied to the boss 23 is released, the side wall of the second storage cavity 22 and the boss 23 jointly play a role of fixing the second substrate 40.

Figure 10:
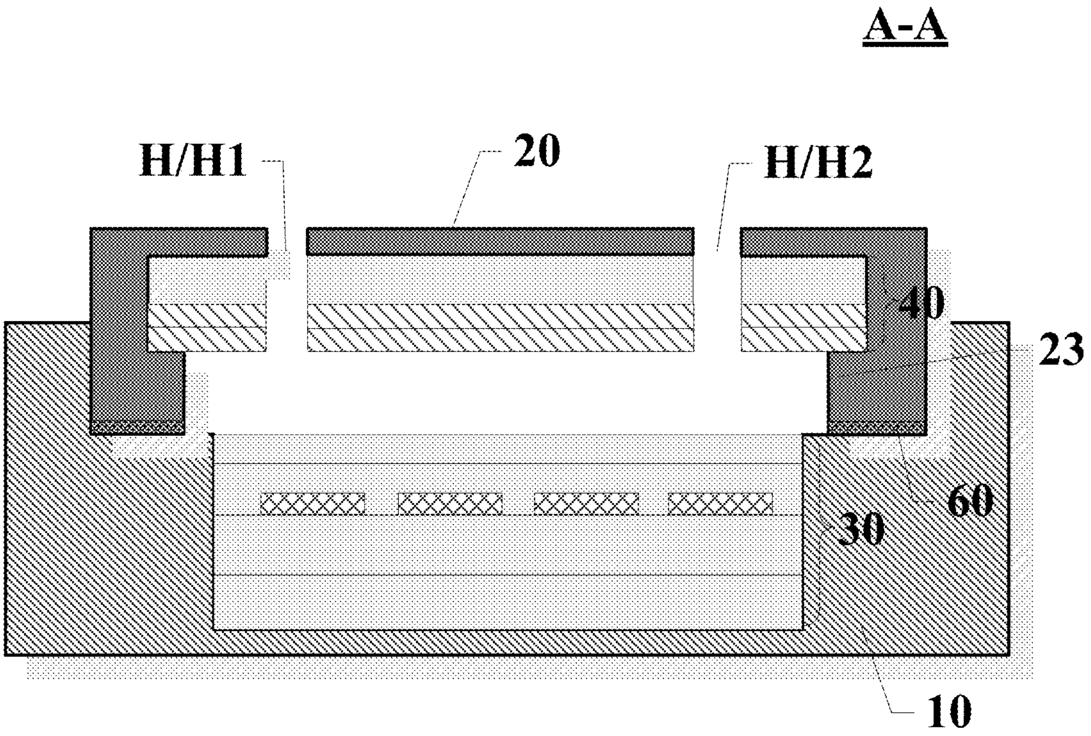
FIG. 10 illustrates another A-A cross-sectional view of the microfluidic device in FIG. 2.

FIG. 10 illustrates another A-A cross-sectional view of the microfluidic device in FIG. 2. In one optional embodiment, a sealant 60 is arranged between the second storage box 20 and the bottom of the third storage cavity 13.

Specifically, before the second storage box 20 is nested into the third storage cavity 13, a surface of the second storage box 20 facing the third storage cavity 13 can be lightly dipped with the sealant 60. In the embodiment, the sealant 60 is arranged on a sidewall surface of the second storage cavity 22 facing the third storage cavity 13 and a surface of the boss 23 facing the third storage cavity 13. After the second storage box 20 is nested into the third storage cavity 13, the sealant 60 can be configured to seal between the bottom of the third storage cavity 13 and the second storage box 20. When silicone oil is injected into the first channel TD through the liquid guide holes H, due to a sealing effect of the sealant 60, a leakage of the silicone oil from a joint between the second storage box 20 and the third storage cavity 13 is effectively avoided.

It should be noted that, when the sealant 60 is introduced between the bottom of the third storage cavity 13 and the second storage box 20, a separation of the first storage box 10 and the second storage box 20 may not be affected. That is, even if the sealant 60 is introduced between the third storage cavity 13 and the second storage box 20, the first storage box 10 and the second storage box 20 can still be separated by an external force, which does not affect a reuse of the first storage box 10 and the second storage box 20.

It should also be noted that FIG. 10 only illustrates a solution of introducing the sealant 60 when the second storage box 20 is arranged with a boss. For a solution shown in FIG. 2 or FIG. 7, although a boss is not introduced into the second storage box 20, a sealant can still be arranged between the second storage box 20 and the bottom of the third storage cavity 13, which is not specifically limited herein.

Figure 11:
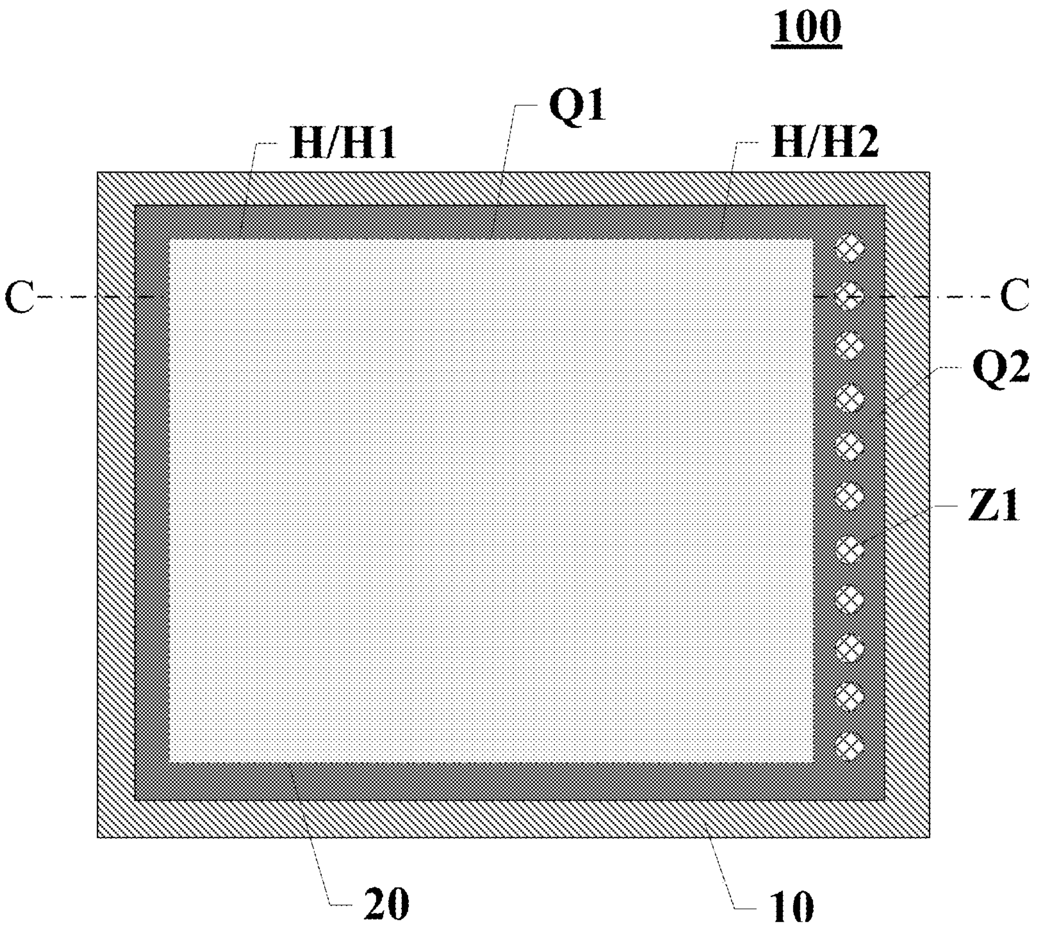
FIG. 11 illustrates another planar view of a microfluidic device provided by an embodiment of the present disclosure.
Figure 12:
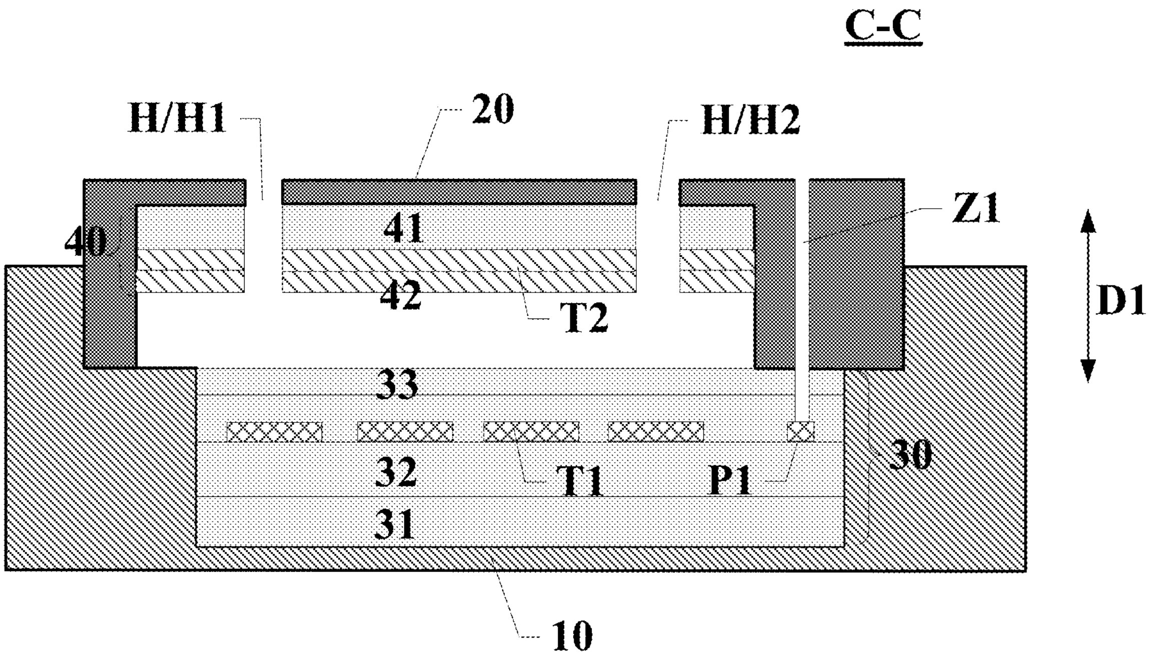
FIG. 12 illustrates a C-C cross-sectional view of the microfluidic device in FIG. 11.
Figure 13:
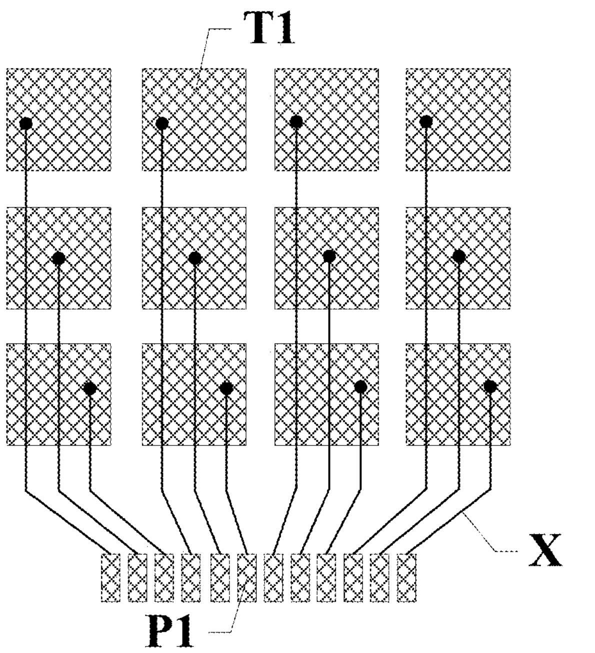
FIG. 13 illustrates a connection diagram of first electrodes and first conductive pads.

FIG. 11 illustrates another planar view of a microfluidic device provided by an embodiment of the present disclosure. FIG. 12 illustrates a C-C cross-sectional view of the microfluidic device in FIG. 11. FIG. 13 illustrates a connection diagram of first electrodes and first conductive pads. Referring to FIGS. 11-13, in one optional embodiment, the microfluidic device includes a first area Q1 and a second area Q2 arranged on a periphery of the first area Q1. The second area Q2 includes a plurality of first conductive pads P1. The first substrate 30 includes the first base 31 and a plurality of first electrodes T1 arranged on a side of the first base 31 facing the second substrate 40. The plurality of first electrodes T1 is in the second area Q2, the plurality of first conductive pads P1 is on the first substrate 30, and a first electrode T1 is correspondingly connected to a first conductive pad P1 through a signal line X. The microfluidic device further includes a plurality of first pinholes Z1, along the first direction D1, the plurality of first pinholes Z1 penetrate through the first storage box 10 or the second storage box 20 and expose the plurality of first conductive pads P1.

In one embodiment, when the microfluidic device is used to detect a detection liquid, it is necessary to respectively apply electrical signals to the first electrodes T1 on the first substrate 30 and the second electrode T2 on the second substrate 40. When the third storage cavity 13 wraps around a side wall of the second storage box 20, a signal transmission can be performed by pressing a pin. Specifically, the microfluidic device is divided into a first area Q1 and a second area Q2. The first area Q1 is an area where the first channel TD is located, and the first electrodes T1 are also in the first area Q1 for providing a driving electric field to the detection liquid. The second area Q2 is on a periphery of the first area Q1. In the embodiment, a plurality of first conductive pads P1 are arranged in the second area Q2, and a first electrode T1 is electrically connected to a conductive pad through a signal line. The plurality of first pinholes Z1 for exposing the plurality of first conductive pads P1 is also arranged in the second area Q2. When an electrical signal needs to be provided to a first electrode T1, a pressing pin can be arranged in a first pinhole Z1, and the pressing pin is electrically connected to a first conductive pad P1, so that the electrical signal can be provided to the first electrode T1 through the pressing pin. A method of providing electrical signals to the first electrodes T1 through pressing pins is conductive to ensuring a sealing performance of the microfluidic device without binding the first substrate 30 to a flexible circuit board, which is conducive to simplifying a structure of the microfluidic device and simplifying an assembly difficulty of the microfluidic device.

Figure 14:
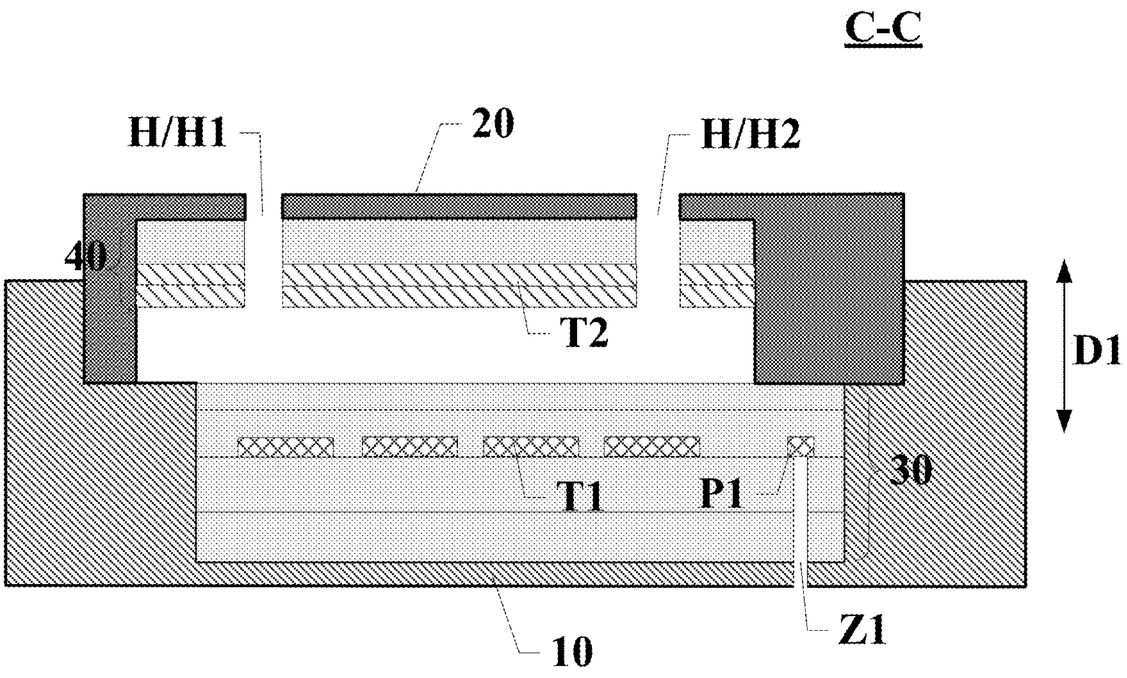
FIG. 14 illustrates another C-C cross-sectional view of the microfluidic device in FIG. 11.

It should be noted that the embodiment in FIG. 12 shows a solution in which the first pinhole Z1 penetrates the second storage box 20 and exposes the first conductive pad P1. In some other embodiments, the first pinhole Z1 may also expose the first conductive pad P1 by penetrating through the first storage box 10. For example, referring to FIG. 14, a purpose of providing electrical signals to the first conductive pads P1 and the first electrodes T1 can also be achieved. FIG. 14 illustrates another C-C cross-sectional view of the microfluidic device in FIG. 11.

Referring FIG. 12, in one optional embodiment, along the first direction D1, an orthographic projection of the first pinhole Z1 and the first conductive pad P1 to the plane where the first substrate 30 is located does not overlap an orthographic projection of the first channel TD to the plane where the first substrate 30 is located.

Specifically, when a signal is provided to the first conductive pad P1 by means of a pressing pin, and a first pin hole K1 for arranging the pressing pin to pass through the second storage box 20, the first pinhole Z1 does not communicated with the first channel TD. Specifically, the first pinhole Z1 is arranged on a periphery of the first channel TD, which is conductive to avoid a liquid leakage in the first channel TD caused by an introduction of the first pinhole Z1 and is conductive to ensuring a sealing performance of the microfluidic device.

Figure 15:
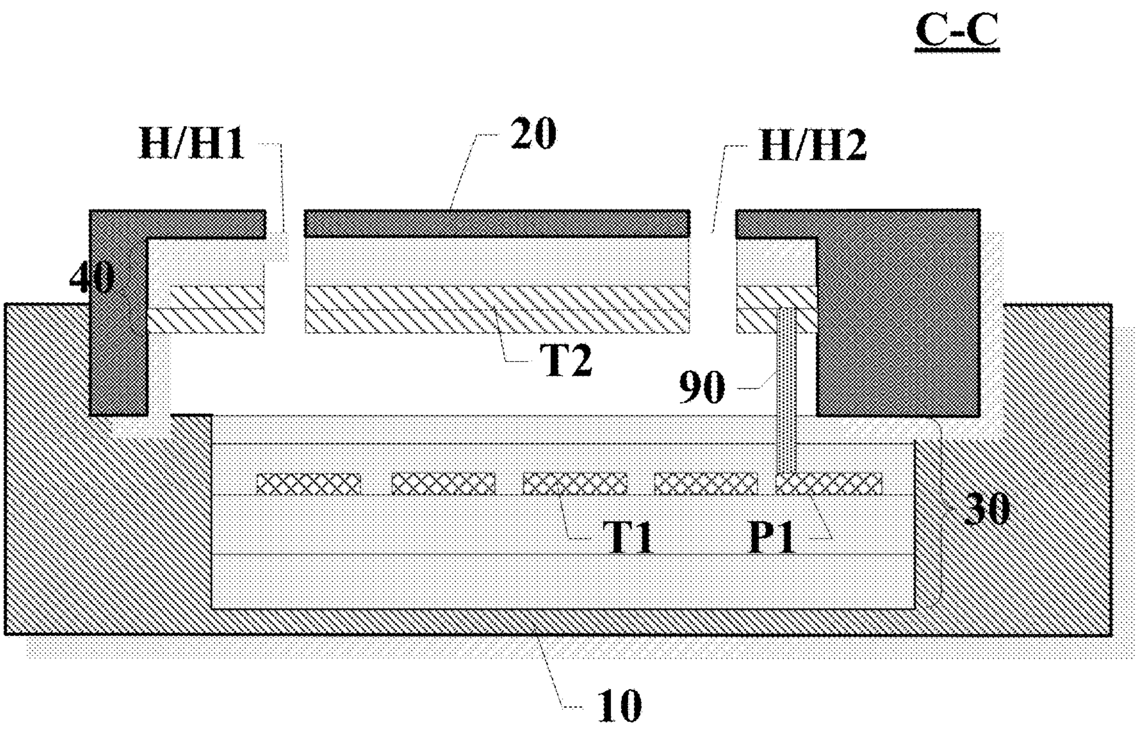
FIG. 15 illustrates another C-C cross-sectional view of the microfluidic device in FIG. 11.

FIG. 15 illustrates another C-C cross-sectional view of the microfluidic device in FIG. 11. Referring to FIG. 11 and FIG. 15, in one optional embodiment, the second substrate 40 includes a second base 41 and a second electrode T2 arranged on a side of the second base 41 facing the first substrate 30. The second electrode T2 is at least in the first area Q1, and the second electrode T2 receives a fixed voltage signal. The second electrode T2 is electrically connected to at least one first conductive pad P1 on the first substrate 30 through a conductive glue 90.

Optionally, the first electrode T1 is configured to receive a driving signal, and the second electrode T2 is configured to receive a fixed voltage signal. In one embodiment, the first conductive pad P1 for transmitting a fixed voltage signal is arranged on the first substrate 30, and the second electrode T2 is electrically connected to the first conductive pad P1 through the conductive glue 90. The fixed voltage signal can be transmitted to the second electrode T2 through the first conductive pad P1 on the first substrate 30 side, so that only the first conductive pad P1 on a side of the first substrate 30 needs to be electrically connected to the pressing pin through the first pinhole Z1, which is conducive to simplifying a complexity of providing signals to the first electrodes T1 and the second electrode T2 through pressing pins.

Figure 16:
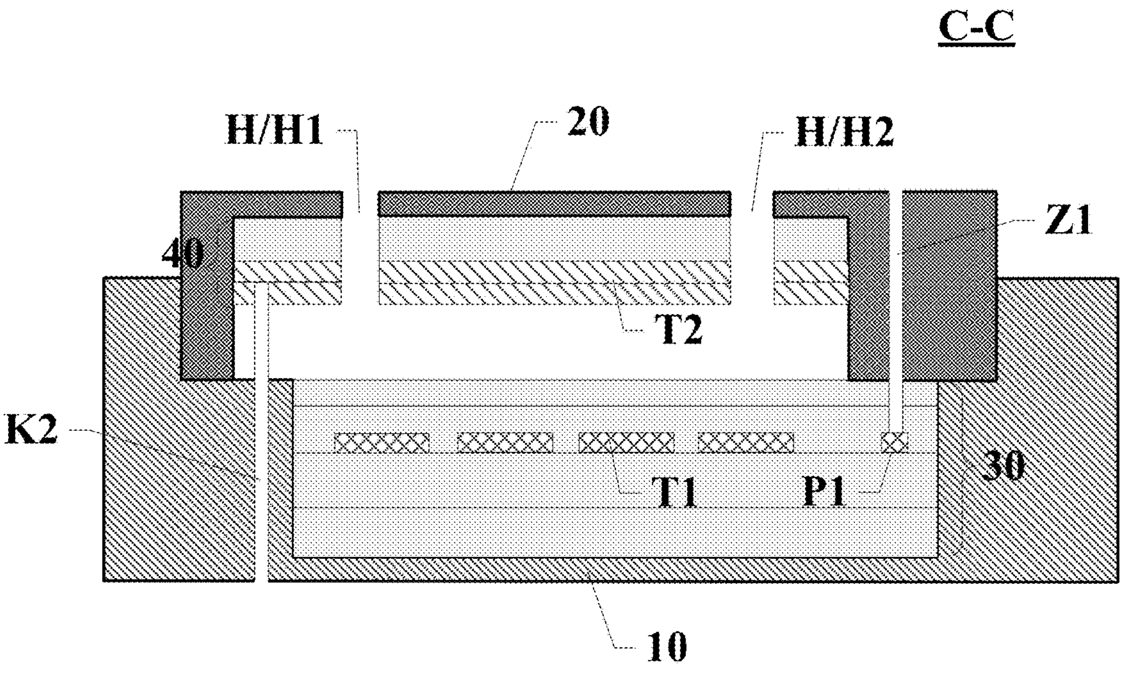
FIG. 16 illustrates another C-C cross-sectional view of the microfluidic device in FIG. 11.
Figure 17:
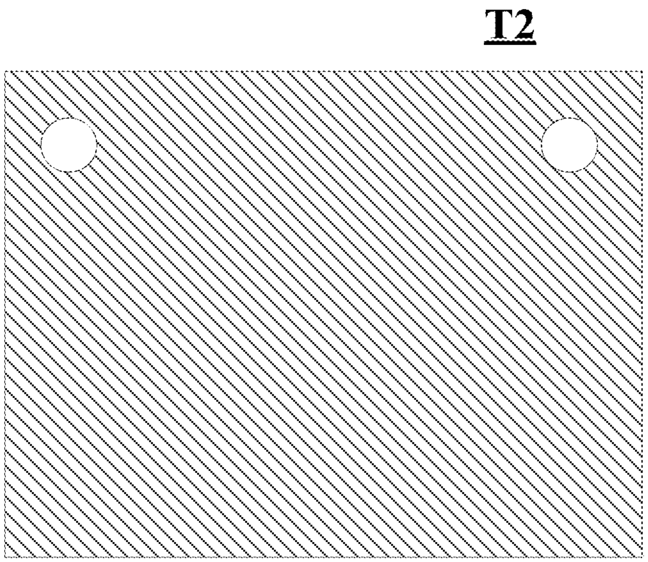
FIG. 17 illustrates a planar view of a second electrode in FIG. 16.

FIG. 16 illustrates another C-C cross-sectional view of the microfluidic device in FIG. 11. FIG. 17 illustrates a planar view of a second electrode in FIG. 16. One embodiment shows another way of providing electrical signals to the first electrodes T1 and the second electrode T2 through pressing pins. Referring to FIG. 16 and FIG. 17, in one optional embodiment, the second substrate 40 includes a second base 41 and the second electrode T2 arranged on the side of the second base 41 facing the first substrate 30. The second electrode T2 receives a fixed voltage signal. The microfluidic device includes at least one second pinhole K2, along the first direction D1, the second pinhole K2 penetrates through the first storage box 10 or the second storage box 20 and exposes at least part of the second electrode T2.

Optionally, the second electrode T2 on the second substrate 40 is a planar electrode. In one embodiment, the second conductive pad can be regarded as part of the planar second electrode T2. Optionally, the embodiment shows a solution in which the second pinhole K2 penetrates through the first storage box 10 and exposes at least part of the second conductive pad. In some other embodiments, the second pinhole K2 may also expose the second conductive pad by penetrating through the second storage box 20, which is not specifically limited herein.

Optionally, one embodiment shows a solution of arranging a plurality of second pinholes K2 in the microfluidic device. Fixed voltage signals are provided simultaneously to the second electrodes T2 through a plurality of pressing pins, which is conductive to improving a signal uniformity on the planar second electrodes T2. In the embodiment, the first conductive pad P1 is introduced on the first substrate 30, and a second conductive pad is introduced on the second substrate 40. The first conductive pad P1 and the second conductive pad are respectively exposed by the first pinhole Z1 and the second pinhole K2, and electric signals can be provided to the first electrodes T1 and the second electrode T2 by pressing pins through the first pinhole Z1 and the second pinhole K2.

Figure 18:
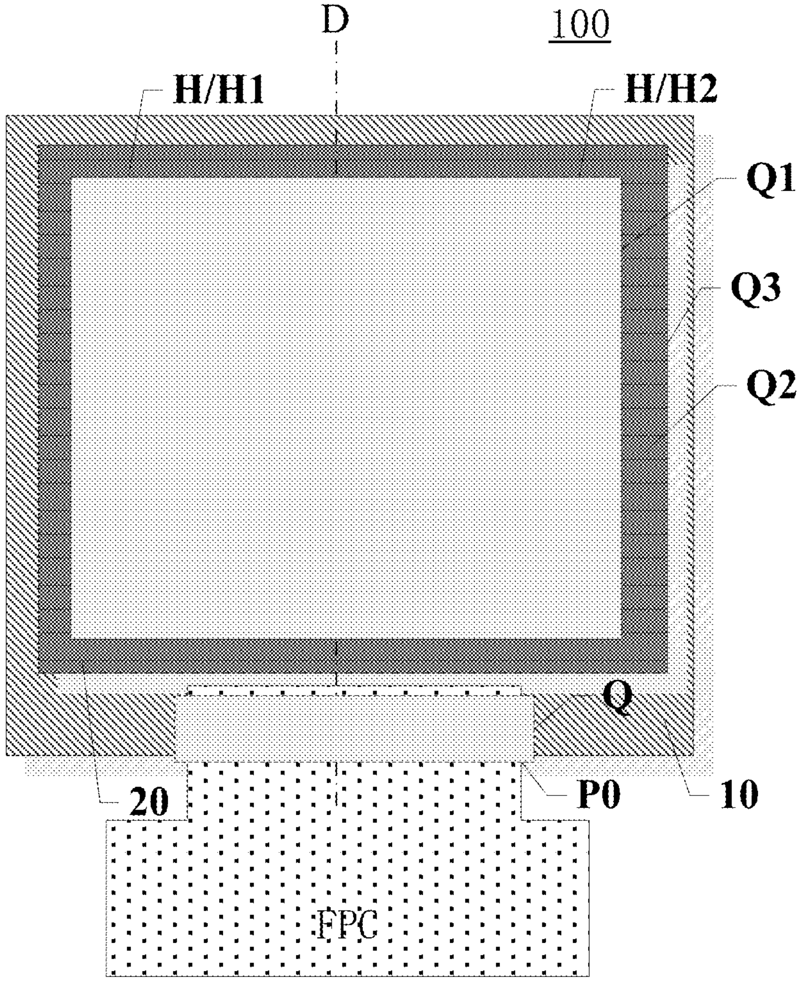
FIG. 18 illustrates another planar view of a microfluidic device provided by an embodiment of the present disclosure.
Figure 19:
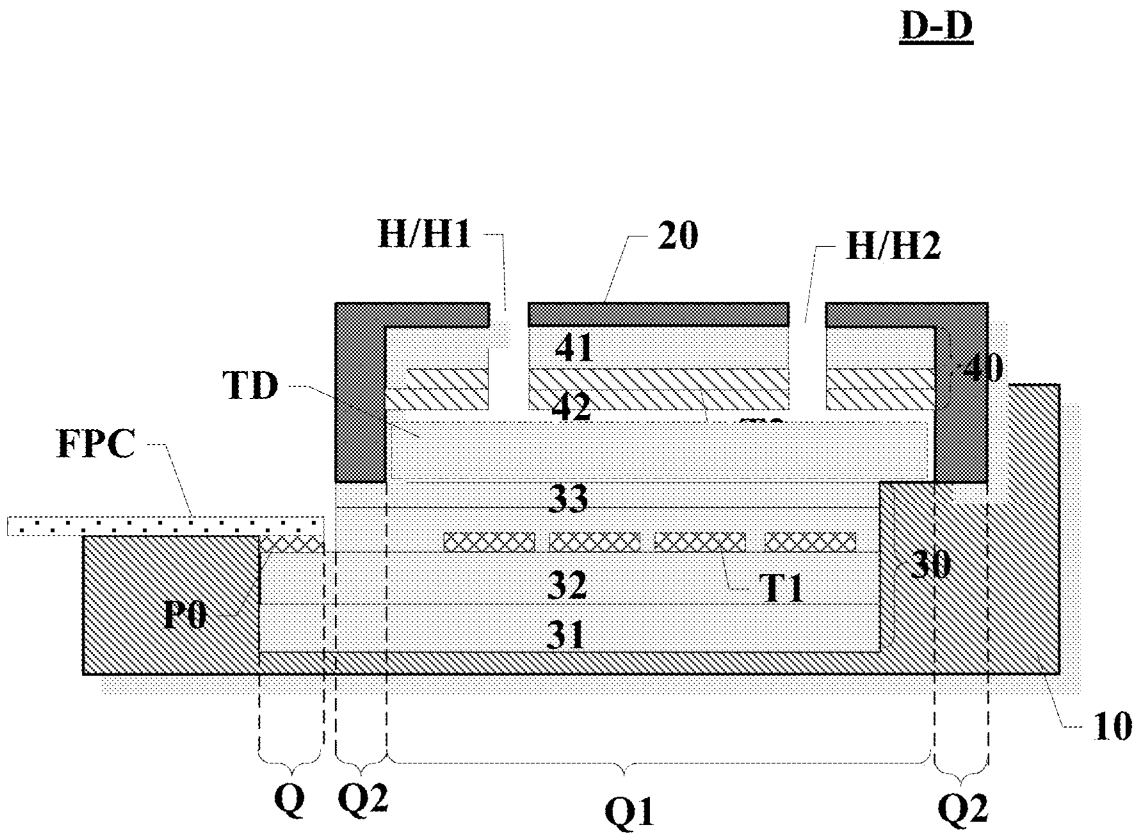
FIG. 19 illustrates a D-D cross-sectional view of the microfluidic device in FIG. 18.

FIG. 18 illustrates another planar view of a microfluidic device provided by an embodiment of the present disclosure. FIG. 19 illustrates a D-D cross-sectional view of the microfluidic device in FIG. 18. Referring FIG. 18 and FIG. 19, in one optional embodiment, the microfluidic device includes a box forming area Q3 and a binding area Q on a first side of the box forming area Q3, the second storage box 20 is only in the box forming area Q3, and the binding area Q includes a plurality of conductive pads P0. The first substrate 30 includes a first base 31 and a plurality of first electrodes T1 arranged on a side of the first base 31 facing the second substrate 40. The second substrate 40 includes a second base 41 and a second electrode T2 arranged on the side of the second base 41 facing the first substrate 30. The first electrodes T1 and the second electrode T2 are electrically connected to the conductive pads P0.

The embodiment shows a solution in which the binding area Q is introduced into the microfluidic device, and the first electrodes T1 and the second electrode T2 are electrically connected to the conductive pad P0 in the binding area Q through a signal line. Specifically, the binding area Q is arranged on a periphery of the box forming area Q3, and the box forming area Q3 can be regarded as an overlapping area of the first storage box 10 and the second storage box 20, and a size of the second storage box 20 is smaller than a size of the first storage box 10. The binding area Q is in an area where the first storage box 10 does not overlap the second storage box 20 and is on the first substrate 30. The first electrode T1 on the first substrate 30 is electrically connected to the conductive pad P0 in the binding area Q through a signal line. The second electrode T2 on the second substrate 40 can be connected to the conductive pad P0 on the first substrate 30 through the conductive glue 90. Binding a flexible circuit board FPC on the conductive pad P0 of the binding area Q, electrical signals can be transmitted to the first electrodes T1 and the second electrode T2 through the flexible circuit board FPC. Electrical signals are transmitted to the first electrodes T1 and the second electrode T2 through the flexible circuit board FPC, which is conductive to improving an accuracy and stability of signal transmission.

Referring to FIG. 18 and FIG. 19, in one optional embodiment, the box forming area Q3 includes a first area Q1 and a second area Q2 surrounding the first area Q1, the first electrodes T1 and the second electrode T2 are in the first area Q1 and are on the first side of the box forming area Q3. The second area Q2 is between the binding area Q and the first area Q1. In the second area Q2, a sidewall of the second storage box 20 facing a surface of the first substrate 30 is fixed to the first substrate 30.

In one embodiment, in the microfluidic device, the second containment box 20 has three side walls fitted with the first containment box 10, and one side wall is not fitted with the first containment box 10. The side wall not fitted with the first storage box 10 is in the second area Q2 of the box forming area Q3, and an area where the first electrodes T1 and the second electrode T2 are located is in the first area Q1 of the box forming area Q3. The binding area Q is on a side of an area where the side wall is not fitted with the first storage box 10 is located away from the first channel TD, i.e., the second area Q2 is between the binding area Q and the first area Q1. In the second area Q2, part of a side wall of the first storage box 10 which is not fitted with the second storage box 20 is exposed outside. Fixing a surface of part of a side wall facing the first storage box 10 to the first substrate 30, e.g., Pressing the surface of the part of the side wall of the second storage box 20 facing the first storage box 10 to the first substrate 30 with a jig, can reduce or avoid a gap formed between the side wall of the second storage box 20 facing the first storage box 10 and the first substrate 30, thereby prevent liquid in the first channel TD from leaking from between the side wall of the second storage box 20 facing the first storage box 10 and the first substrate 30, to ensure a sealing performance of the microfluidic device.

Figure 20:
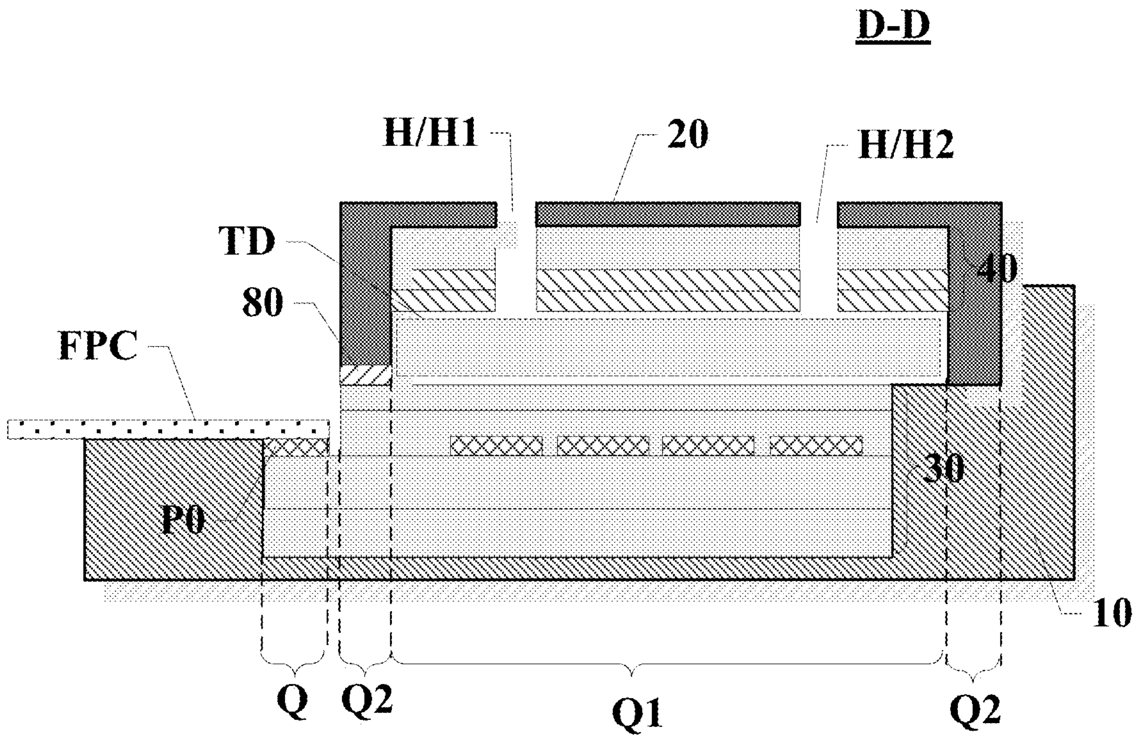
FIG. 20 illustrates another D-D cross-sectional view of the microfluidic device in FIG. 18.

FIG. 20 illustrates another D-D cross-sectional view of the microfluidic device in FIG. 18. In one optional embodiment, the microfluidic device further includes a sealing gasket 80. Specifically, the second area Q2 is adjacent to the binding area Q, the sealing gasket 80 is on a surface of a side wall of the second storage box 20 facing the first substrate 30 and the first substrate 30.

In the embodiment, by introducing the sealing gasket 80 between a surface of the second storage box 20 facing the first substrate 30 and the first substrate 30 in the second area Q2 adjacent to the binding area Q, a sealing performance between the first storage box 10 and the first substrate 30 in the second area Q2 can be effectively improved, which is conductive to improving an overall sealing performance of the microfluidic device. In addition, the introduction of the sealing gasket 80 can also buffer a stress between a surface of a side wall of the first storage box 10 facing the first substrate 30 and the first substrate 30, to avoid an excessive stress between the surface of the side wall of the first storage box 10 facing the first substrate 30 and the first substrate 30 to damage the first substrate 30.

Figure 21:
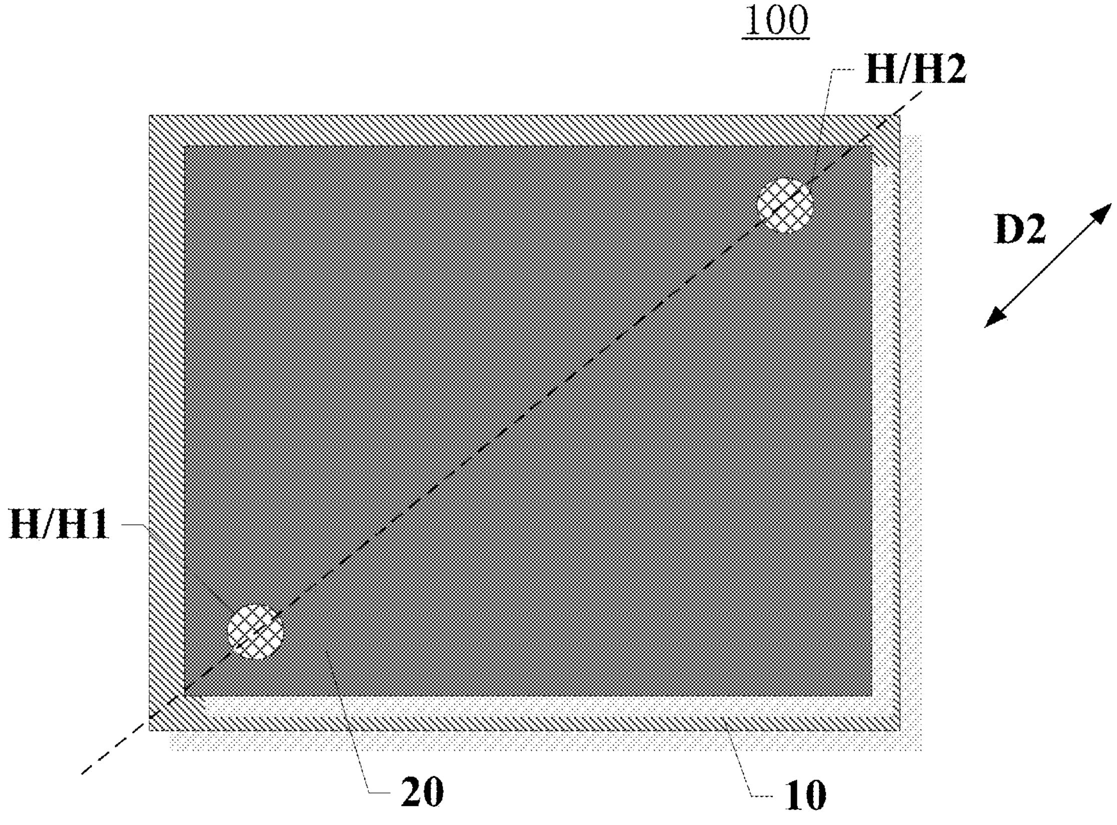
FIG. 21 illustrates another planar view of a microfluidic device provided by an embodiment of the present disclosure.

FIG. 21 illustrates another planar view of a microfluidic device provided by an embodiment of the present disclosure. In one optional embodiment, the liquid guide holes H include at least one liquid injection hole H1 and at least one liquid outlet hole H2 at two ends of the microfluidic device along a second direction D2, which is an extending direction of the diagonal of the microfluidic device.

The embodiment shows a solution in which the liquid injection hole H1 and the liquid outlet hole H2 are arranged in the microfluidic device, that is, a channel for injecting liquid into the first channel TD of the microfluidic device is separated from a channel for discharging liquid from the microfluidic device. The liquid injection hole H1 is specifically configured for injecting liquid, such as silicon oil and a detection liquid, into the first channel TD, and the liquid outlet hole H2 is specifically configured for discharging the liquid from the first channel TD. Considering that liquid in the first channel TD may not be same as liquid injected through the liquid injection hole H1 after a detection is completed, the method of separately arranging liquid injection hole H1 and the liquid outlet hole H2 is conductive to avoiding liquid contamination of the liquid injection hole H1. In addition, in the embodiment, the liquid injection hole H1 and the liquid outlet hole H2 are arranged in the extending direction of the diagonal line of the microfluidic device. For example, the liquid injection hole H1 and the liquid outlet hole H2 are respectively arranged at two opposite corners along the diagonal direction, which is conductive to increasing a distance between the liquid injection hole H1 and the liquid outlet hole H2, is more conductive to avoiding a situation that liquid enters the liquid injection hole H1 when liquid is discharged from the liquid outlet hole H2, and is more conductive to avoiding a pollution of the liquid injection hole H1.

Figure 22:
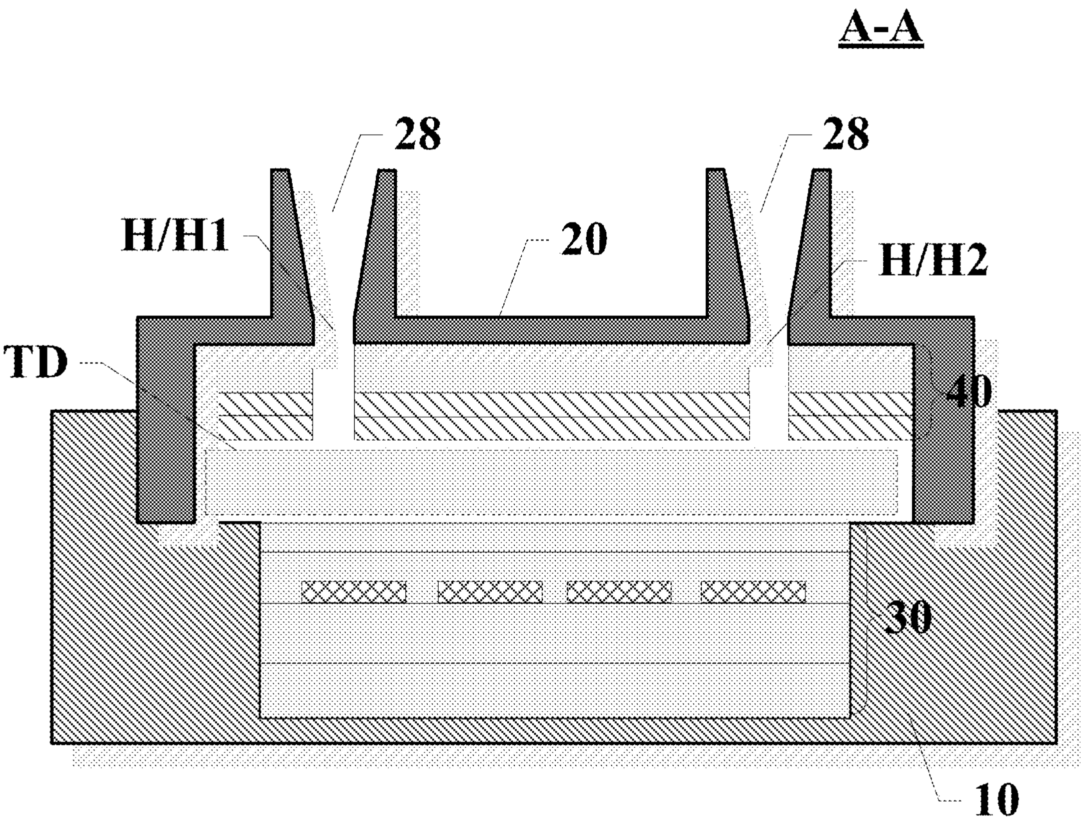
FIG. 22 illustrates another A-A cross-sectional view of the microfluidic device in FIG. 2.

FIG. 22 illustrates another A-A cross-sectional view of the microfluidic device in FIG. 2. In one optional embodiment, the second storage box 20 also includes liquid guide grooves 28 connected to the liquid guide holes H on a side of a bottom surface of the second storage box 20 away from the first storage box 10.

Specifically, the embodiment introduces the liquid guide grooves 28 connected to the liquid guide holes H. Optionally, when the microfluidic device includes the liquid injection hole H1 and the liquid outlet hole H2, the liquid guide grooves 28 corresponding to the liquid injection hole H1 and the liquid outlet hole H2 can be respectively arranged. The liquid guide grooves 28 can be regarded as groove bodies in which the liquid guide holes H extend upward in a direction away from the second substrate 40. Compared with the boss structure at the bottom of the second storage box 20, the groove structure can play a role in draining liquid and facilitate injection and discharge of liquid. In addition, when a certain amount of liquid can also be stored in the liquid guide grooves 28, while the first channel TD is ensured to be filled with liquid, liquid can be prevented from overflowing from positions of the liquid guide holes H to a certain extent.

Optionally, the liquid guiding grooves 28 on the second storage box 20 are integrally formed with the second storage box 20, to simplify a forming process of the second storage box 20.

Referring to FIG. 22, in one optional embodiment, an inner wall of a liquid guide groove 28 is in a shape of an inverted cone or a cylinder. In practical application, liquid can be injected into the first channel TD of the microfluidic device by means of an external tool such as a pipette gun. An inner wall of the liquid guide groove 28 is arranged as an inverted cone or a cylinder, which facilitates a cooperation of the pipette gun and the liquid guide grooves 28, thereby facilitating injection and discharge of liquid.

Figure 23:
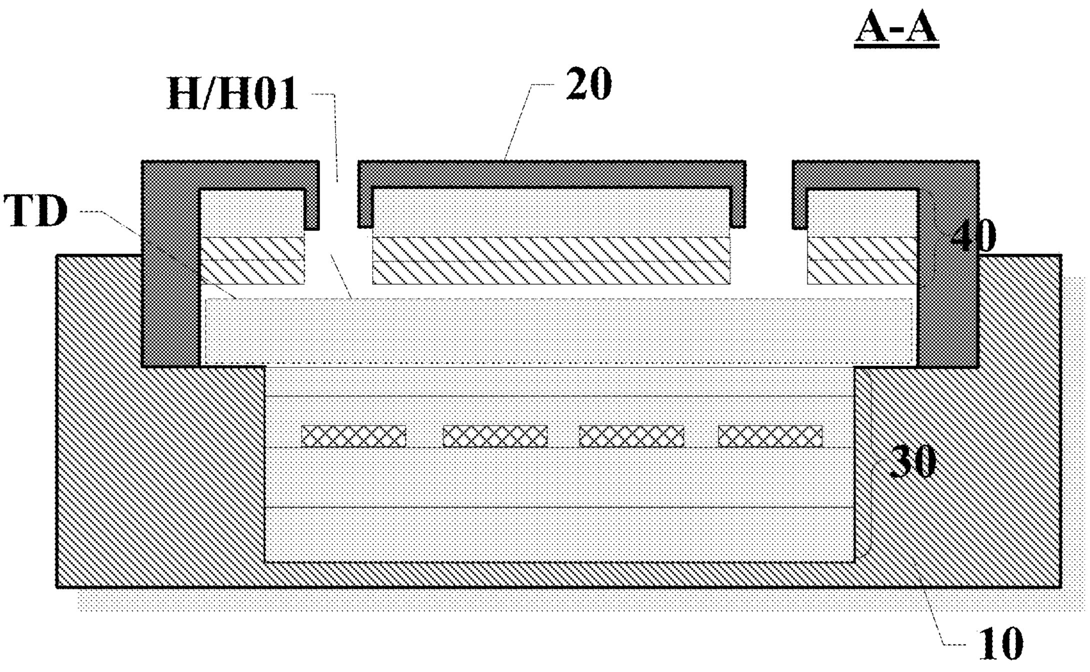
FIG. 23 illustrates another A-A cross-sectional view of the microfluidic device in FIG. 2.

FIG. 23 illustrates another A-A cross-sectional view of the microfluidic device in FIG. 2. In one optional embodiment, the liquid guide holes H include a first sub liquid guide hole H01 and a second sub liquid guide hole H02 communicating with the first sub liquid guide hole H01, the first sub liquid guide hole H01 is in the second storage box 20, and the second sub liquid guide hole H02 is on the second substrate 40. At least part of an outer wall of the first sub-drain hole H01 is nested with at least part of an inner wall of the second sub-drain hole H02.

Referring to FIG. 23, in the embodiment, the liquid guide holes H include a first sub liquid guide hole H01 on the second storage box 20 and a second sub liquid guide hole H02 on the second substrate 40. The first liquid guide hole H01 and the second liquid guide hole H02 are in communication, both the first liquid guide hole H01 and the second liquid guide hole H02 communicate with the first channel TD. In the embodiment, a side wall of the first sub-drain hole H01 is extended to be nested in the second sub liquid guide hole H02. That is, at least part of an outer wall of the first sub liquid guide hole H01 is nested with at least a part of the inner wall of the second sub liquid guide hole H02. A side wall of the first sub-liquid guide hole H01 can also play a certain role in fixing the second substrate 40, thereby improving a reliability of fixing the second substrate 40 in the second storage box 20.

Referring to FIG. 23, in one optional embodiment, a cavity bottom of the second storage box 20 is made of a transparent material, and the second substrate 40 is a transparent substrate.

Specifically, when both a cavity bottom of the second storage box 20 and the second substrate 40 are arranged to be transparent, during a process of liquid droplet detection using the microfluidic device, a state of a detection liquid in the first channel TD can be observed through the cavity bottom of the second storage box 20 and the second substrate 40, which is conductive to improving a convenience of detection.

Figure 24:
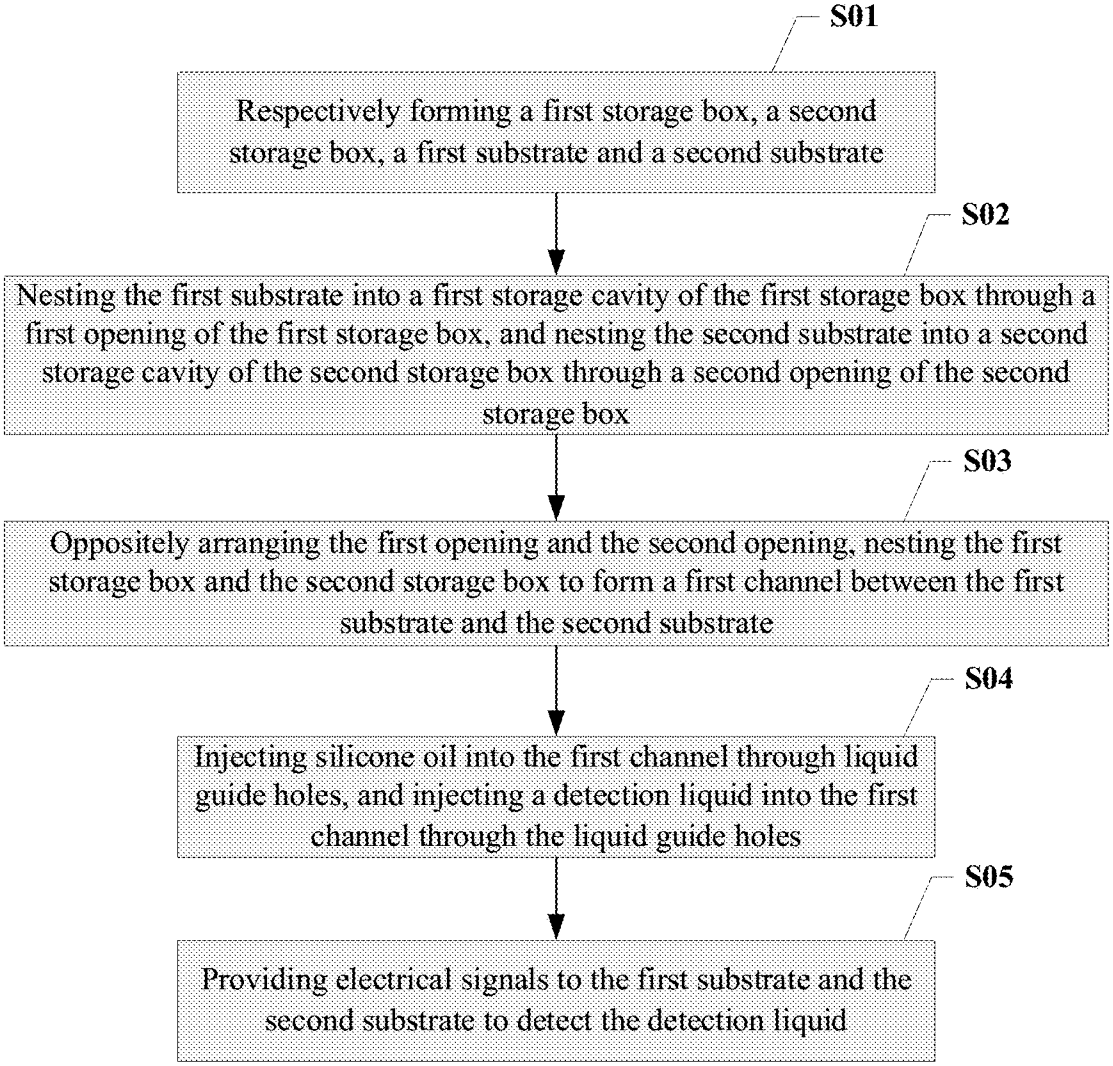
FIG. 24 illustrates a flow chart of an application method of a microfluidic device provided by an embodiment of the present disclosure.

Based on a same inventive concept, the present disclosure also provides an application method of a microfluidic device. FIG. 24 illustrates a flow chart of an application method of a microfluidic device provided by an embodiment of the present disclosure. The application method includes the following steps.

Figure 25:
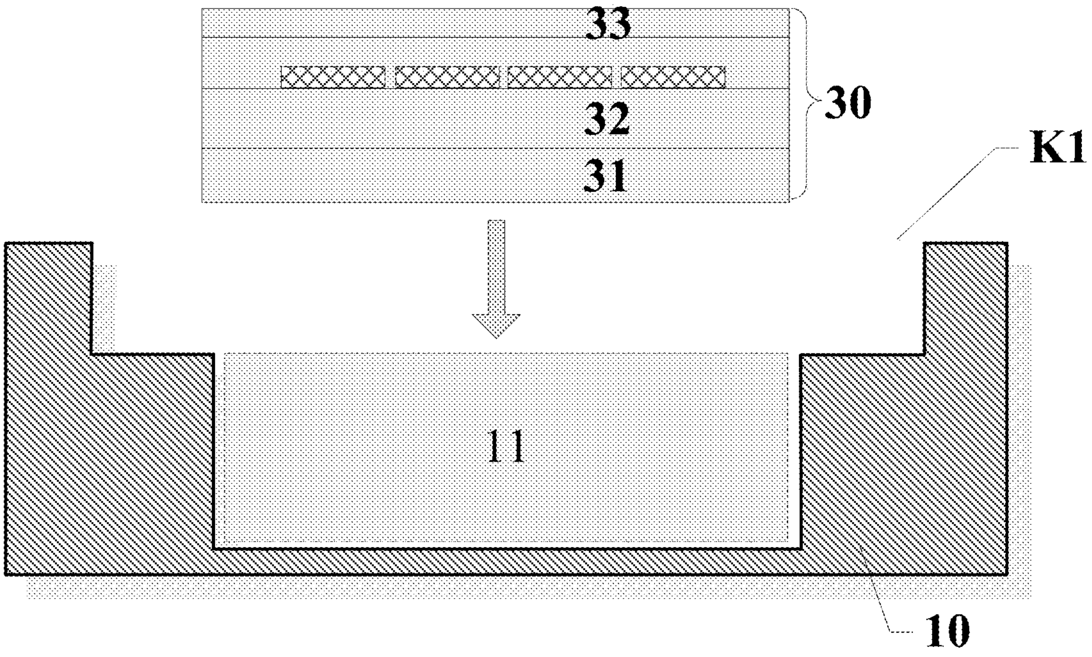
FIG. 25 illustrates a schematic diagram of nesting a first substrate into a first storage box.
Figure 26:
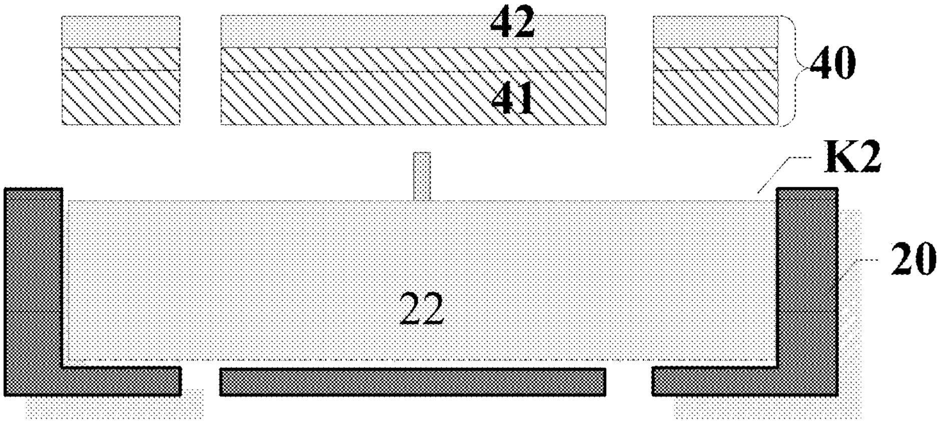
FIG. 26 illustrates a schematic diagram of nesting a second substrate into a second storage box.

S01: referring to FIG. 25 and FIG. 26, respectively forming the first storage box 10, the second storage box 20, the first substrate 30 and the second substrate 40.

S02: nesting the first substrate 30 into the first storage cavity 11 of the first storage box 10 through the first opening K1 of the first storage box 10, and nesting the second substrate 40 into the second storage cavity 22 of the second storage box 20 through the second opening K2 of the second storage box 20, wherein FIG. 25 illustrates a schematic diagram of nesting the first substrate 30 into the first storage box 10, and FIG. 26 illustrates a schematic diagram of nesting the second substrate 40 into the second storage box 20.

Figure 27:
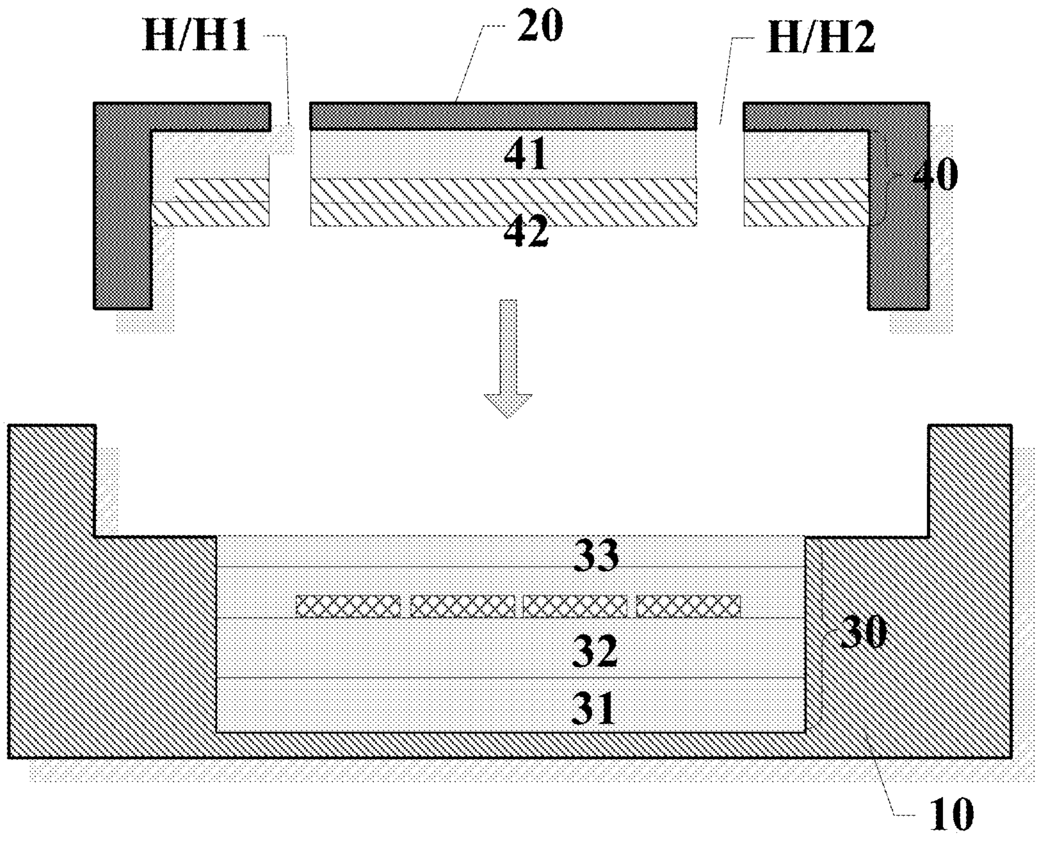
FIG. 27 illustrates a schematic diagram of an opposite arrangement of a first storage box and a second storage box.

S03: referring to FIG. 27 and in combination of FIG. 25 and FIG. 26, oppositely arranging the first opening K1 and the second opening K2, referring to FIG. 3, nesting the first storage box 10 and the second storage box 20 to form a first channel TD between the first substrate 30 and the second substrate 40, wherein FIG. 27 illustrates a schematic diagram of an opposite arrangement of the first storage box 10 and the second storage box 20.

S04: injecting silicone oil into the first channel TD through the liquid guide holes H, and injecting a detection liquid into the first channel TD through the liquid guide holes H.

S05: providing electrical signals to the first substrate 30 and the second substrate 40 to detect the detection liquid.

Specifically, in the application method of the microfluidic device provided by the embodiments of the present disclosure, the first storage box 10, the second storage box 20, the first substrate 30, and the second substrate 40 are mutually independent and are assembling components. The first storage box 10 and the second storage box 20 can be formed by injection molding with an injection molding material. The injection molding material has a certain degree of elasticity and can be slightly deformed by applying an external force and can return to an original shape of the injection molding material after the external force is released. In practical application, the first substrate 30 can be nested into the first storage cavity 11 of the first storage box 10, the second substrate 40 can be nested into the second storage cavity 22 of the second storage box 20, the first opening K1 of the first storage box 10 and the second opening K2 of the second storage box 20 are oppositely arranged, and the first storage box 10 and the second storage box 20 are nested, so that the first substrate 30 and the second substrate 40 are oppositely arranged along the first direction D1, and the first channel TD for containing silicone oil and a detection liquid is formed between the first substrate 30 and the second substrate 40. After the first storage box 10 and the second storage box 20 are nested, the detection liquid and silicon oil can be injected into the first channel TD through the liquid guide holes H, and a detection of the detection liquid can be realized by providing electrical signals to the first electrodes T1 on the first substrate 30 and the second electrode T2 on the second substrate 40. In the application method provided by the present specification, the first channel TD can be formed without introducing a double-sided adhesive tape or gasket between the first substrate 30 and the second substrate 40, and only the first storage box 10 and the second storage box 20 need to be nested, which is conductive to simplifying a production process of the microfluidic device and improve a production efficiency. Moreover, nesting the first storage box 10 and the second storage box 20 is conductive to improving an alignment accuracy of the first substrate 30 and the second substrate 40.

Figure 28:
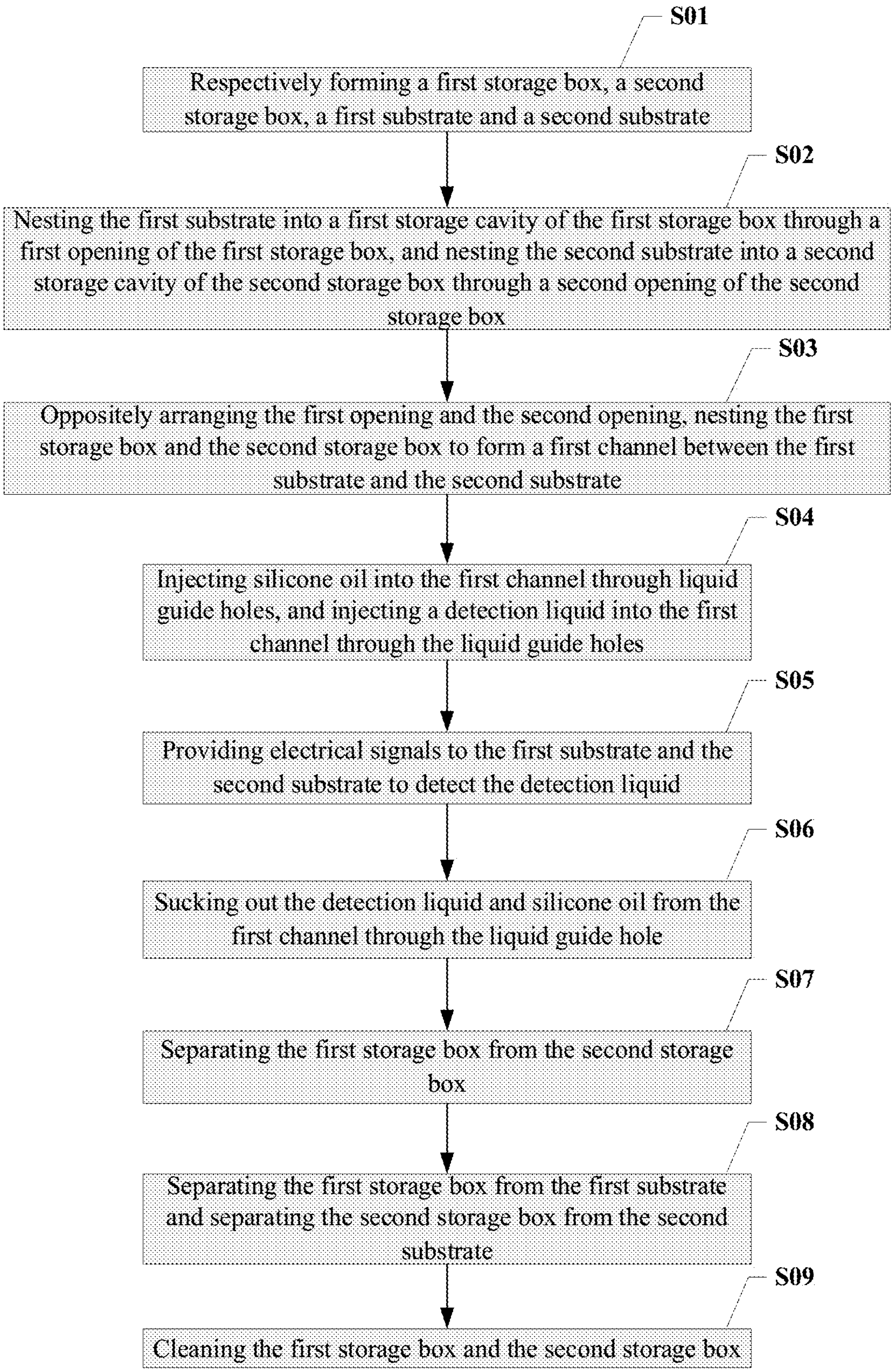
FIG. 28 illustrates another flow chart of an application method of a microfluidic device provided by an embodiment of the present disclosure.

FIG. 28 illustrates another flow chart of an application method of a microfluidic device provided by an embodiment of the present disclosure. In one optional embodiment, referring to FIG. 28, FIG. 3 and FIG. 27, the application method of the microfluidic device also includes the following steps.

S06: sucking out the detection liquid and silicone oil from the first channel TD through the liquid guide hole H.

S07: separating the first storage box 10 from the second storage box 20.

S08: separating the first storage box 10 from the first substrate 30 and separating the second storage box 20 from the second substrate 40.

S09: cleaning the first storage box 10 and the second storage box 20.

Specifically, the embodiment shows an application method after a detection of a droplet is completed using the microfluidic device. After the detection is completed, a detection liquid and silicon oil can be sucked out through the liquid guide hole H, and the first storage box 10 is separated from the second storage box 20 by an external force, and the first storage box 10 into which the first substrate 30 is nested and the second storage box 20 into which the second substrate 40 is nested are obtained. An external force can be applied to the first storage box 10 to take out the first substrate 30 from the first storage box 10, and an external force can be applied to the second storage box 20 to take out the second substrate 40 from the second storage box 20. The first storage box 10 and the second storage box 20 can be cleaned so that the first storage box 10 and the second storage box 20 can be reused, which improves an application convenience of the microfluidic device provided by the embodiments of the present disclosure.

As disclosed, the microfluidic device, and the application method thereof provided by the present disclosure at least achieve the following beneficial effects.

In the microfluidic device provided by the present specification, the first substrate is fixed in the first storage box, the second substrate is fixed in the second storage box, and the first storage box and the second storage box are assembled in a nested manner, so that the first substrate and the second substrate are oppositely arranged, and the first channel is formed between the first substrate and the second substrate. The first channel can be formed without introducing a structure such as a double-sided tape or gasket between the first substrate and the second substrate, and only the first storage box and the second storage box need to be nested, which is conductive to simplifying a production process of the microfluidic device and improve a production efficiency. Moreover, by nesting the first storage box and the second storage box, no manual adjustment is required, which is conductive to improving an alignment accuracy of the first substrate and the second substrate.

In the application method of the microfluidic device provided by the present specification, only the first substrate needs to be nested into the first storage box, and the second substrate needs to be nested into the second storage box. The first opening of the first storage box and the second opening of the second storage box are oppositely nested to complete an assembly. An operation of the assembly is simple and convenient and has a high alignment accuracy. In addition, a detection of the detection liquid can be realized only by injecting silicon oil and the detection liquid into the channel formed by the first substrate and the second substrate through the liquid guide hole and providing electrical signals to the first substrate and the second substrate, thereby greatly improving an application convenience of the microfluidic device.

Although some specific embodiments of the present disclosure have been described in detail by way of examples, a person skilled in the art should understand that the above examples are for illustration only and are not intended to limit the scope of the present disclosure. The above embodiments can be modified by a person skilled in the art without departing from the scope and spirit of the present disclosure. The protection scope of the present disclosure is limited by appended claims.

What is claimed is:

1. A microfluidic device, comprising:

a first substrate and a second substrate that are oppositely arranged along a first direction;

a first storage box and a second storage box that are oppositely arranged along the first direction;

the first direction being a thickness direction of the microfluidic device, wherein:

the first storage box includes a first storage cavity and a first opening communicating with the first storage cavity, and the first substrate is fixed in the first storage cavity, the second storage box includes a second storage cavity and a second opening communicating with the second storage cavity, and the second substrate is fixed in the second storage cavity, and along the first direction, the first opening is arranged opposite to the second opening, the first storage box is nested with the second storage box, and a first channel is formed between the first substrate and the second substrate; and liquid guide holes passing through the second substrate and the second storage box along the first direction and communicating with the first channel.

2. The microfluidic device according to claim 1, wherein the first storage box is integrally formed by injection molding, and the second storage box is integrally formed by injection molding.

3. The microfluidic device according to claim 1, wherein:

the first storage box includes a third storage cavity, the third storage cavity is between the first opening and the first storage cavity along the first direction, the third storage cavity communicates with the first opening and the first storage cavity respectively; and an orthographic projection of a cavity bottom of the third storage cavity to a plane where the first substrate is located surrounds an orthographic projection of the first storage cavity to the plane where the first substrate is located, and at least part of the second storage box in the third storage cavity and nested with an inner side wall of the third storage cavity.

4. The microfluidic device according to claim 3, wherein the third storage cavity is arranged around the second storage box, an inner side wall of the third storage chamber includes at least one recessed part, and an empty groove is formed between an outer side wall of the second storage box and the at least one recessed part.

5. The microfluidic device according to claim 4, wherein:

the second storage box includes a boss connected to a side wall of the second storage cavity, the boss surrounds the second opening, and an orthographic projection of the boss to a plane where the second substrate at least partially overlaps an orthographic projection of the second storage cavity to the plane where the second substrate is located; and the second substrate is fixed between the boss and a cavity bottom of the second storage cavity.

6. The microfluidic device according to claim 1, wherein a sealant is arranged between the second storage box and a bottom of the third storage cavity.

7. The microfluidic device according to claim 1, comprising:

a first area and a second area arranged on a periphery of the first area, the second area comprising a plurality of first conductive pads, wherein:

the first substrate includes a first substrate and a plurality of first electrodes arranged on a side of the first substrate facing the second substrate, the plurality of first electrodes is in the second area, and the plurality of first conductive pads is on the first substrate, and a first electrode is correspondingly connected to a first conductive pad through a signal line; and a plurality of first pinholes, along the first direction, the plurality of first pinholes penetrating through the first storage box or the second storage box and exposing the plurality of first conductive pads.

8. The microfluidic device according to claim 7, wherein:

along the first direction, an orthographic projection of the plurality of first pinholes and the plurality of first conductive pads to the plane where the first substrate is located does not overlap an orthographic projection of the first channel to the plane where the first substrate is located.

9. The microfluidic device according to claim 7, wherein:

the second substrate includes a second substrate and a second electrode arranged on a side of the second substrate facing the first substrate, the second electrode is at least in the first area, the second electrode receives a fixed voltage signal; and the second electrode is electrically connected to at least one first conductive pad on the first substrate through conductive glue.

10. The microfluidic device according to claim 7, wherein:

the second substrate includes a second substrate and a second electrode arranged on a side of the second substrate facing the first substrate, and the second electrode receives a fixed voltage signal; and the microfluidic device includes at least one second pinhole, and along the first direction, the second pinhole penetrates through the first storage box or the second storage box and exposes at least part of the second electrode.

11. The microfluidic device according to claim 1, comprising a box forming area and a binding area on a first side of the box forming area, the second storage box being only in the box forming area, and the binding area comprising a plurality of conductive pads, wherein:

the first substrate includes a first substrate and a plurality of first electrodes arranged on a side of the first substrate facing the second substrate;

the second substrate includes a second substrate and a second electrode arranged on a side of the second substrate facing the first substrate; and both the plurality of first electrodes and the second electrode are electrically connected to the plurality of conductive pads.

12. The microfluidic device according to claim 11, wherein:

the box forming area includes a first area and a second area surrounding the first area, the plurality of first electrodes and the second electrode are in the first area, and the second area is between the binding area and the first area on the first side of the box forming area; and in the second area, a side wall of the second storage box facing a surface of the first substrate is fixed to the first substrate.

13. The microfluidic device according to claim 12, comprising a sealing gasket between the surface of the side wall of the second storage box facing the first substrate and the first substrate in the second area.

14. The microfluidic device according to claim 1, wherein the liquid guide holes include at least one liquid injection hole and at least one liquid outlet hole, at least one liquid injection hole and at least one liquid outlet hole are at two ends of the microfluidic device along a second direction extending a diagonal of the microfluidic device.

15. The microfluidic substrate according to claim 1, wherein the second storage box further comprises liquid guiding grooves communicating with the liquid guide holes and being on a side of a bottom surface of the second storage box away from the first storage box.

16. The microfluidic device according to claim 15, wherein an inner wall of the guide groove is in a shape of an inverted cone or a cylinder.

17. The microfluidic device according to claim 1, wherein:

the liquid guide holes include a first sub liquid guide hole and a second sub liquid guide hole communicated with the first sub liquid guide hole, the first sub liquid guide hole is in the second storage box, the first sub liquid guide hole is in the second storage box, and the second sub liquid guide hole is on the second substrate; and at least part of an outer wall of the first sub liquid guide hole is nested with at least part of the inner wall of the second sub liquid guide hole.

18. The microfluidic device according to claim 1, wherein a cavity bottom of the second storage box is made of a transparent material, and the second substrate is a transparent substrate.

* * * * *